(12) United States Patent
Tourki et al.

(10) Patent No.: US 12,388,687 B2
(45) Date of Patent: Aug. 12, 2025

(54) GENERATION AND RECEPTION OF DOUBLE-SIDE EXTENDED SLEPIAN-BASED WAVEFORM SYMBOLS

(71) Applicant: HUAWEI TECHNOLOGIES CO., LTD., Guangdong (CN)

(72) Inventors: Kamel Tourki, Munich (DE); Rostom Zakaria, Munich (DE); Merouane Debbah, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 84 days.

(21) Appl. No.: 18/524,048

(22) Filed: Nov. 30, 2023

(65) Prior Publication Data

US 2024/0113922 A1  Apr. 4, 2024

Related U.S. Application Data

(63) Continuation of application No. PCT/EP2021/064661, filed on Jun. 1, 2021.

(51) Int. Cl.
*H04L 25/03* (2006.01)
*H04L 25/02* (2006.01)
*H04L 27/26* (2006.01)

(52) U.S. Cl.
CPC .... *H04L 25/03828* (2013.01); *H04L 25/0212* (2013.01); *H04L 27/2605* (2013.01); *H04L 27/2639* (2013.01)

(58) Field of Classification Search
CPC ............. H04L 25/0224; H04L 25/0204; H04L 2027/003; H04L 25/022; H04L 25/03821; H04L 2027/0057; H04L 27/2601; H04W 24/08; H04W 24/10; H04W 24/04; H04W 24/02; H04W 64/006; H04W 16/14;
(Continued)

(56) References Cited

U.S. PATENT DOCUMENTS

2018/0138953 A1* 5/2018 Murakami .......... H04L 25/0222
2018/0234285 A1* 8/2018 Djordjevic ............. H01Q 21/00
(Continued)

FOREIGN PATENT DOCUMENTS

WO  2022242871 A1  11/2022

OTHER PUBLICATIONS

P.Guan et al.,"5G Field Trials:OFDM-Based Waveforms and Mixed Numerologies,"in IEEE Journal on Selected Areas in Communications, vol. 35,No. 6,Jun. 2017, total 10 pages.
(Continued)

*Primary Examiner* — Eva Y Puente

(57) ABSTRACT

A device may obtain an input symbol sequence for transmission. The device may further obtain a set of DPS sequences associated with $N_i$ highest eigenvalues of a Slepian matrix and a set of extended sequences comprising the set of DPS sequences appended with extension symbols derived based on a convolution of respective DPS sequences. The device may modulate the set of extended sequences based on the input symbol sequence to generate a signal comprising Slepian-based waveform symbol(s). Another device may receive the signal, remove the extension symbols, and demodulate Slepian-based waveform symbol(s) of the signal based on the set of DPS sequences.

18 Claims, 12 Drawing Sheets

(58) Field of Classification Search
CPC . H04W 64/00; H04W 72/0453; H04W 76/11; H04B 7/024; H04B 7/0456; H04B 7/0626; H04B 7/063; H04B 7/0632; H04B 7/0639; H04B 7/0486; H04B 10/616; H04B 7/0417
See application file for complete search history.

(56) References Cited

U.S. PATENT DOCUMENTS

| | | | | |
|---|---|---|---|---|
| 2024/0077598 A1* | 3/2024 | Delude | ............... | G01S 15/8954 |
| 2024/0348483 A1* | 10/2024 | Tourki | ............... | H04L 27/2639 |
| 2024/0372757 A1* | 11/2024 | Tourki | ............... | H04L 27/2639 |

OTHER PUBLICATIONS

D.Slepian et al.,"Prolate Spheroidal wave functions, Fourier analysis and uncertainty-I", Bell System Technology Journal,vol. 40,1961,total 21 pages.

T.Zemen et al.,"Time-variant channel estimation using discrete prolate spheroidal sequences",IEEE Trans.Sig. Processing,53(9),Sep. 2005,total 11 pages.

B.M.Hochwald et al.,"Achieving near-capacity on a multiple antenna channel," in IEEE Transactions on Communications,vol. 51,No. 3,Mar. 2003,total 11 pages.

D.Slepianet"Prolate spheroidal wave functions,Fourier analysis,and uncertainty-V:The discrete case",Bell System Technical Journal,vol. 57,May-Jun. 1978,total 60 pages.

Y.- S.Choi,et al.,"On channel estimation and detection for multicarrier signals in fast and selective Rayleigh fading channels",IEEE Trans.Communications,49(8),Aug. 2001.total 13 pages.

X.Cai et al.,"Bounding performance and suppressing intercarrier interference in wireless mobile OFDM",IEEE Trans. Communications,51(12),Dec. 2003.total 10 pages.

L. Rugini et al.,"Simple equalization of time-varying channels for OFDM",IEEE Communications Letters,9(7),Jul. 2005,total 3 pages.

L. Rugini et al., "Low-complexity banded equalizers for OFDM systems in Doppler spread channels",Eurasip Journal on Applied Signal Processing,vol. 2006,total 13 pages.

XD Wang et al.,"Wireless Communication Systems-Advanced Techniques for Signal Reception",Prentice Hall PTR, Jun. 2, 2002,total 763 pages.

Jun Wang et al.,"Soft-output MMSE OSIC MIMO detector with reduced-complexity approximations",2007 IEEE 8th Workshop on Signal Processing Advances in Wireless Communications, Helsinki,2007,total 5 pages.

Evangelos Vlachos et al.,"Low-Complexity OSIC Equalization forOFDM-Based Vehicular Communications",IEEE Transactions on Vehicular Technology,vol. 66,No. 5,May 2017,total 12 pages.

Huawei:"Make 5G Backhaul Feasible Everywhere",Feb. 2019,total 14 pages.

* cited by examiner

GENERATION AND RECEPTION OF DOUBLE-SIDE EXTENDED SLEPIAN-BASED WAVEFORM SYMBOLS

CROSS-REFERENCE TO RELATED APPLICATIONS

This application is a continuation of International Application PCT/EP2021/064661, filed on Jun. 1, 2021, the disclosure of which is hereby incorporated by reference in its entirety.

TECHNICAL FIELD

The present disclosure generally relates to the field of wireless communications. In particular, some embodiments of the disclosure relate to the use of discrete prolate spheroidal (DPS) sequences in the generation and reception of signals.

BACKGROUND

Wireless communication signals may be transmitted on dedicated radio channels and, in some applications, it may be desired to generate signals that are well time-frequency localized. Discrete prolate spheroidal (DPS) sequences provide a solution for maximizing spectral containment of finite length sequences and they may be obtained as eigenvectors of a Slepian matrix. However, applying discrete prolate spheroidal sequences in wireless communication may not be straightforward due to characteristics of the radio channel and various requirements of different communication systems.

SUMMARY

This summary introduces a selection of concepts in a simplified form that are further described below in the detailed description. This summary is not intended to identify key features or essential features of the claimed subject matter, nor is it intended to be used to limit the scope of the claimed subject matter.

It is an objective of the present disclosure to enable the generation and reception of signals with reduced out-of-band emissions. The foregoing and other objectives may be achieved by the features of the independent claims. Further implementation forms are apparent from the dependent claims, the description, and the drawings.

According to a first aspect, a device for generating a signal is provided. The device may be configured to obtain an input symbol sequence; obtain a set of discrete prolate spheroidal sequences associated with Ni highest eigenvalues of a Slepian matrix, wherein $N_1$ is an integer; obtain a set of extended sequences comprising the set of discrete prolate spheroidal sequences appended with extension symbols derived based on convolution of respective discrete prolate spheroidal sequences, wherein the extension symbols are normalized by eigenvalues associated with the respective discrete prolate spheroidal sequences; and modulate the set of extended sequences based on the input symbol sequence to generate a Slepian-based waveform symbol of the signal. This solution enables the generation of spectrally well-contained Slepian-based waveform (SWF) signals.

According to an implementation form of the first aspect, the discrete prolate spheroidal sequences may comprise eigenvectors of the Slepian matrix $C_i$, where elements (p, q) of the Slepian matrix are $$C_i[p, q] = \frac{\sin(\pi B_s T_s (p-q))}{\pi(p-q)},$$

where $(p, q) \in \{1, \ldots, N\}^2$, N is a length of the discrete prolate spheroidal sequences, $B_s$ is a bandwidth of the signal, and $T_s$ is a sampling period. This solution enables to generate an SWF signal for a given bandwidth considering the length of the DPS sequences and the sampling period.

According to an implementation form of the first aspect, the device may be further configured to append L/2 extension symbols at a beginning of each of the set of discrete prolate spheroidal sequences and at an end of each of the discrete prolate spheroidal sequences, wherein L is a number of the extension symbols for each of the set of discrete prolate spheroidal sequences. This solution enables an equal distribution of the extension symbols on both sides of the DPS sequences. This enables lower level out-of-band emissions when compared for example to cyclic prefix or zero padding based approaches.

According to an implementation form of the first aspect, the device may be further configured to determine the extension symbols $\tilde{S}_i[n, q]$ based on $$\tilde{S}_i[n, q] = \frac{1}{\lambda_q} \sum_{m=0}^{N-1} \frac{\sin(\pi B_s T_s (m-n))}{\pi(m-n)} S_i[m, q],$$

where $$n \in \left\{-\frac{L}{2}, \ldots, -1\right\} \text{ and } n \in \left\{N, \ldots, N + \frac{L}{2} - 1\right\}$$

is an extension symbol index, q is a sequence index, $\lambda_q$ is an eigenvalue of a q-th discrete prolate spheroidal sequence, and $S_i$ is a matrix with elements (m, q) comprising the set of discrete prolate spheroidal sequences. This solution provides an implementation for determining the extension symbols to improve the spectral containment of the generated SWF signal, which results in lower level of out-of-band emissions.

According to an implementation form of the first aspect, the device may be further configured to obtain a plurality of input symbol sequences for transmission in a plurality of Slepian-based waveform symbols; modulate the set of extended sequences based on the plurality of the input symbol sequences to generate a Slepian-based waveform symbol sequence; and insert a plurality of training sequences periodically within the Slepian-based waveform symbol sequence, wherein each of the plurality of training sequences comprises L zeros at a beginning of the training sequence and L zeros at an end of the training sequence. This solution enables a channel estimation at a receiver with training sequences suitable for the generated SWF signal.

According to an implementation form of the first aspect, the device may be further configured to obtain a plurality of input symbol sequences for transmission in a plurality of Slepian-based waveform symbols on a plurality of frequency sub-bands $f_i$; obtain a plurality of the sets of discrete prolate spheroidal sequences associated with $N_i$ highest eigenvalues of a plurality of Slepian matrices $C_i$, wherein i is a frequency sub-band index; obtain a plurality sets of extended sequences comprising the plurality sets of discrete prolate spheroidal sequences appended with extension symbols derived based on convolution of respective discrete prolate spheroidal sequences, wherein the extension symbols are normalized by eigenvalues associated with the respective discrete prolate spheroidal sequences; modulate the plurality sets of extended sequences based on the plurality of input symbol sequences to generate a plurality of Slepian-based waveform symbol sequences; insert a plurality of training sequences periodically within the plurality of Slepian-based waveform symbol sequences, wherein each of the plurality of training sequences comprises L zeros at a beginning of the training sequence and L zeros at an end of the training sequence; and frequency-shift the plurality of Slepian-based waveform symbol sequences to the plurality of frequency sub-bands $f_i$. This solution enables the joint generation of SWF signals on multiple sub-bands.

According to an implementation form of the first aspect, the non-zero elements of the plurality of training sequences comprise $b_k = e^{-j\pi Jk(k+1)/E}$, where $k \in \{0, \ldots, E-1\}$, E is an odd integer, and J is a prime integer to E. This solution enables an improved channel estimation for the SWF signal at a receiver.

According to a second aspect, a device for receiving a signal is disclosed. The device may be configured to receive the signal, wherein the signal comprises at least one Slepian-based waveform symbol modulated based on an extended set of sequences comprising discrete prolate spheroidal sequences associated with $N_i$ highest eigenvalues of a Slepian matrix appended with extension symbols derived based on convolution of respective discrete prolate spheroidal sequences, wherein $N_i$ is an integer and wherein the extension symbols are normalized by eigenvalues associated with the respective discrete prolate spheroidal sequences; remove the extension symbols from the at least one Slepian-based waveform symbol; and demodulate the at least one Slepian-based waveform symbol based on the discrete prolate spheroidal sequences associated with the $N_i$ highest eigenvalues of the Slepian matrix. This solution enables an efficient reception of spectrally well-contained SWF signals based on a non-extended DPS sequence.

According to an implementation form of the second aspect, the device may be further configured to receive a plurality of Slepian-based waveform symbols; receive a plurality of training sequences located periodically within the plurality of Slepian-based waveform symbols, wherein each of the plurality of training sequences comprises L zeros at a beginning of the training sequence and L zeros at an end of the training sequence; stack the received plurality of training sequences into a vector of received training sequences; determine an estimate of a radio channel for the plurality of Slepian-based waveform symbols based on the vector of received training sequences; and equalize the plurality of Slepian-based waveform symbols based on the estimate of the radio channel. This solution improves the efficiency of reception of SWF signals by joint equalization and demodulation of multiple SWF symbols.

According to an implementation form of the second aspect, the device may be further configured to receive the plurality of Slepian-based waveform symbols and the plurality of training sequences on a plurality of frequency sub-bands $f_i$, wherein the plurality of the Slepian-based waveform symbols are associated with a plurality of Slepian matrices $C_i$, wherein i is a frequency sub-band index. This solution improves the efficiency of reception of SWF signals by joint equalization and demodulation of multiple SWF symbols received on multiple frequency sub-bands.

According to an implementation form of the second aspect, non-zero elements of the plurality of training sequences comprise $b_k = e^{-j\pi Jk(k+1)/E}$, where $k \in \{0, \ldots, E-1\}$, E is an odd integer, and J is a prime integer to E. This solution enables an improved channel estimation for the SWF signal at the device.

According to an implementation form of the second aspect, the vector of received training sequences $y_b$ may be of the form $y_b = \phi_b h + \eta_b$, where $\eta_b$ is additive noise, where $h = [h_0^T \ldots h_Q^T]^T$ and $h_q = [c_{q,0} \ldots C_{q,L_h}]^T$ comprises q-th coefficients of $L_h + 1$ delay taps of a Slepian basis expansion of the radio channel h, and where matrix $\phi_b$ comprises $$\phi_b = \begin{bmatrix} D_{0,0}^b & \cdots & D_{Q,0}^b B_0 \\ \vdots & \ddots & \vdots \\ D_{0,NP}^b B_{NP} & \cdots & D_{Q,NP}^b B_{NP} \end{bmatrix},$$

where $D_{q,i}^b$ is a diagonal matrix comprising a subset of a q-th eigenvector of the Slepian matrix, wherein the subset of the q-th eigenvector is dependent on index $i \in \{0, \ldots, NP\}$, where NP+1 is a number of the received plurality of training sequences, and where $B_i$ is a Toeplitz matrix comprising the plurality of training sequences, and wherein the device is further configured to determine the estimate of the radio channel based on a linear minimum mean squared error estimator based on the matrix $\phi_b$. This solution enables an efficient minimum mean square error based channel estimation for multiple SWF symbols jointly.

According to an implementation form of the second aspect, $D_{q,i}^b = \text{diag}[u_q(t(b_i))]$, where $t(b_i) = i\,P\,D + L : (i\,D+1)P-1$, where $P = N+L$ and $D-1$ is a number of Slepian-based waveform symbols between training sequences, and wherein $$B_i = \begin{bmatrix} b_{0,i} & 0 & \cdots & 0 \\ b_{1,i} & \ddots & \ddots & \vdots \\ \vdots & \ddots & \ddots & 0 \\ b_{K-1,i} & \ddots & \ddots & b_{0,i} \\ 0 & \ddots & \ddots & b_{1,i} \\ \vdots & \ddots & \ddots & \vdots \\ 0 & \cdots & 0 & b_{K-1,i} \end{bmatrix}.$$

This solution provides an implementation for joint MMSE channel estimation for multiple SWF symbols.

According to an implementation form of the second aspect, the estimate of the radio channel may comprise a channel estimate matrix $H_{Det}$ of size $NP(D-1)P \times (L+1)$ and the device may be further configured to demodulate an m-th Slepian-based waveform symbol of the plurality of Slepian-based waveform symbols based on an m-th subset of the channel estimate matrix $H_{D,m} = H_{Det}((1:P)+(m-1)P)$. This solution provides an efficient implementation for demodulation of a single SWF symbol based on a joint channel estimated for multiple SWF symbols.

According to a third aspect, a method is disclosed. The method may comprise obtaining an input symbol sequence; obtaining a set of discrete prolate spheroidal sequences associated with $N_i$ highest eigenvalues of a Slepian matrix, wherein $N_i$ is an integer; obtaining a set of extended sequences comprising the set of discrete prolate spheroidal sequences appended with extension symbols derived based on convolution of respective discrete prolate spheroidal sequences, wherein the extension symbols are normalized by eigenvalues associated with the respective discrete prolate spheroidal sequences; and modulating the set of extended sequences based on the input symbol sequence to generate a Slepian-based waveform symbol of the signal.

This solution enables the generation of spectrally well-contained Slepian-based waveform (SWF) signals.

According to a fourth aspect, a method is disclosed. The method may comprise receiving the signal, wherein the signal comprises at least one Slepian-based waveform symbol modulated based on an extended set of sequences comprising discrete prolate spheroidal sequences associated with $N_i$ highest eigenvalues of a Slepian matrix appended with extension symbols derived based on convolution of respective discrete prolate spheroidal sequences, wherein $N_i$ is an integer and wherein the extension symbols are normalized by eigenvalues associated with the respective discrete prolate spheroidal sequences; removing the extension symbols from the at least one Slepian-based waveform symbol; and demodulating the at least one Slepian-based waveform symbol based on the discrete prolate spheroidal sequences associated with the $N_i$ highest eigenvalues of the Slepian matrix. This solution enables an efficient reception of spectrally well-contained SWF signals based on a non-extended DPS sequences.

According to a fifth aspect, a computer program is provided. The computer program may comprise program code configured to cause performance of any implementation form of the method of the third aspect, when the computer program is executed on a computer.

According to a sixth aspect, a computer program is provided. The computer program may comprise program code configured to cause performance of any implementation form of the method of the fourth aspect, when the computer program is executed on a computer.

Implementation forms of the present disclosure can thus provide devices, methods, and computer programs, for generating or receiving a chirp waveform. Any implementation form may be combined with one or more other implementation forms. These and other aspects of the present disclosure will be apparent from the example embodiment(s) described below.

DESCRIPTION OF THE DRAWINGS

The accompanying drawings, which are included to provide a further understanding of the example embodiments and constitute a part of this specification, illustrate example embodiments and, together with the description, help to explain the example embodiments. In the drawings.

Like references are used to designate like parts in the accompanying drawings.

DETAILED DESCRIPTION

Figure 1:
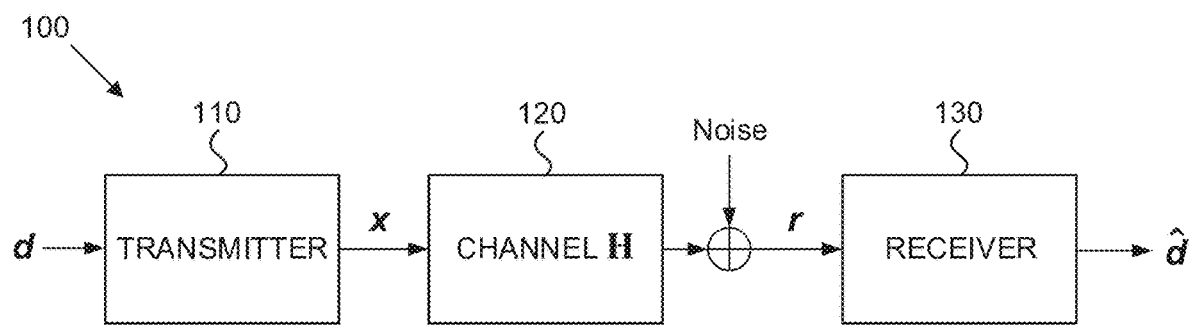
FIG. 1 illustrates an example communication system, according to an embodiment of the present disclosure.

Reference will now be made in detail to example embodiments, examples of which are illustrated in the accompanying drawings. The detailed description provided below in connection with the appended drawings is intended as a description of the present embodiments and is not intended to represent the only forms in which the present examples may be constructed or utilized. The description sets forth the functions of the examples and the sequence of operations for constructing and operating the examples. However, the same or equivalent functions and sequences may be accomplished by different examples.

In order to satisfy diversified requirements of future communication systems, for example the fifth generation (5G) networks defined by the 3rd generation partnership project (3GPP), radio access may be provided by different frequency bands. For example, a multi-layer spectrum layout may be considered, where a super data layer relies on spectrum above 6 GHz, for example within the ranges of 24.25 to 29.5 GHz and 37 to 43.5 GHZ, to address specific use cases requiring extremely high data rates, such as enhanced mobile broadband (eMBB). A coverage and capacity layer may rely on the spectrum in the 2 to 6 GHz range (e.g. C-band) to deliver a sufficient compromise between capacity and coverage. Example applications of the coverage and capacity layer may include ultra-reliable low-latency communications (URLLC), massive machine-type communications (mMTC), and eMBB. A coverage layer may exploit spectrum below 2 GHz (e.g. 1.8 GHZ) to provide wide-area and deep indoor coverage. Example applications of the coverage layer may include URLLC, mMTC, and eMBB.

Many 5G use cases may rely on the coverage and capacity layer. Therefore, a contiguous band of, for example, 100 MHz may be assigned to this layer. However, a single-band solution to jointly increase the capacity and coverage range may raise several challenges. For example, by increasing the size of each individual channel, the receiver complexity may increase accordingly. By adopting channel aggregation in one or more hardware units, the spectral efficiency (SE) may be compromised. For example, guard bands may be needed in case of the filtered orthogonal frequency division multiplexing (f-OFDM) based waveform of 5G. Furthermore, challenges may arise from use of both horizontal and vertical polarization for each channel. Consequently, multi-band solutions may be adopted by combining transmission of one or more channels in more than one frequency bands. Therein, both the desired capacity and coverage may be achieved separately such that ultra-high capacity is achieved by using the higher band, while higher reliability is achieved by using the lower band.

It may be therefore desired to design a waveform that is well time-frequency localized, satisfies the scalable numerology of users, is suitable for bands and carrier aggregation requirements, is MIMO-compliant, and keeps the implementation complexity sufficiently low in doubly selective channels.

A spectrally-localized waveform may be generated using f-OFDM, which may comprise adding a filter f(n) after the N-IFFT (N-point inverse fast Fourier transform) and cyclic prefix (CP) insertion functions of an OFDM transmitter. A corresponding filter f*(−n) may be added before the chain of CP removal, N-FFT (N-point fast Fourier transform), and equalization of an OFDM receiver. By allowing the filter length to exceed the cyclic prefix length of OFDM and designing the filter appropriately, the f-OFDM waveform may achieve a desirable frequency localization for bandwidths as narrow as a few tens of subcarriers, while keeping the inter-symbol interference/inter-carrier interference (ISI/ICI) within an acceptable limit. However, while a frequency localization may be achieved through filtering, the data bandwidth cannot be confined. This lack of design flexibility limits the potential spectral efficiency gains desirable for future communication systems. Furthermore, f-OFDM may not be sufficiently well localized in time for some applications and the filtering may not satisfy the key performance indicators (KPIs) set for future systems, for example in terms of latency.

According to an embodiment, a device may obtain an input symbol sequence for transmission. The device may further obtain a set of discrete prolate spheroidal (DPS) sequences associated with $N_i$ highest eigenvalues of a Slepian matrix and a set of extended sequences comprising the set of DPS sequences appended with extension symbols derived based on convolution of respective DPS sequences. The device may modulate the set of extended sequences based on the input symbol sequence to generate a Slepian-based waveform (SWF) symbol of the signal. Another device may receive the signal, remove the extension symbols, and demodulate Slepian-based waveform symbol(s) of the signal based on the set of DPS sequences.

FIG. 1 illustrates an example communication system 100, according to an embodiment of the present disclosure. The communication system 100 may comprise a transmitter 110, a transmission channel 120, and a receiver 130. The transmitter 110 may generate a transmitted signal x based on an input symbol sequence d, which may comprise a vector of complex-valued data symbols. The transmitter 110 may use SWF to generate Slepian-based modulation symbols that are well localized in time-frequency domain and satisfy design criteria on flexible numerology. A Slepian-based modulation symbol may be based on a set of discrete prolate spheroidal sequences (DPSS), which may be obtained as eigenvectors of a Slepian matrix. The transmitted signal x may be fed through the transmission channel 120, which may be modeled by a channel matrix H. Noise may be modeled by additive white Gaussian noise added after the transmission channel 120. The receiver 130 may demodulate the received signal r to determine an estimate $\hat{d}$ of the input symbol sequence of the input symbols d.

SWF modulation for $N_c$ frequency sub-bands $B_i$, whose central frequencies are given by $f_i$, i=1, ..., $N_c$ may be performed as follows. It is however noted that embodiments of the present disclosure may be applied for a single sub-band, that is, where the number of sub-bands $N_c$ is equal to one.

The transmitter 110 may obtain, for example choose or be preconfigured with, a set of $N_i$ (orthonormal) DPS sequences of length $T=NT_s$ with confined energy in a bandwidth $B_i$ given by the first $N_i$ eigenvectors of the Slepian matrix whose elements (p, q) may be determined based on $$S[p, q] = \frac{\sin(\pi B_s T_s (p-q))}{\pi (p-q)}, (p, q) \in \{1, \ldots, N\}^2$$

The eigenvectors $\{u_j\}_{j=1, \ldots, N}$ may be ordered according to their eigenvalues $\lambda_1 \geq \lambda_2 \ldots \geq \lambda_N$. The set of DPSSs may therefore comprise DPSSs associated with $N_i$ highest eigenvalues of a Slepian matrix. $N_i$ may be an integer. Every central frequency $f_i$ may carry $\Sigma_{k=1}^{N_i} d_{i,k} u_{N_i}$ where $\{d_{i,k}\}$ are the transmitted data symbols of the input symbol sequence. The transmitted signal over $N_c$ sub-bands $B_i$ whose central frequencies are given by ft, i=1, ..., $N_c$ may be determined based on $$x[n] = \Sigma_{i=1}^{N_c} \Sigma_{p=1}^{N_i} d_{i,p} S_i[n, p] e^{j 2\pi f_i n}, n=0, \ldots, N-1.$$

where the matrix $S_i$ is of size N×$N_i$. The transmitted signal may therefore comprise an SWF symbol of the form $\Sigma_{p=1}^{N_i} d_{i,p} S_i[n, p] e^{j 2\pi f_i n}$ on the each of the $N_c$ sub-bands. The system is therefore sending input data symbols given by d. The SWF symbols are given by x, which include the modulated input data symbols.

To enable mitigation of inter-symbol interference (ISI), either a zero-padding (ZP) or a cyclic prefix (CP) may be added to the transmitted signal vector, for example by $$x = \sum_{q=1}^{N_c} E_q S_q d_q$$

where $E_q = \text{diag}\{e^{j 2\pi f_q n}, n = 0, \ldots, N+L-1\}$

Demodulation of the SWF signal may be performed as follows. The received (time domain) signal may be given by $$r = H_t x + \eta = H_t \sum_{q=1}^{N_c} E_q S_q d_q + \eta$$

where $H_t$ is (N+L)×N channel matrix when considering the ZP scheme. For the ZP scheme, the channel matrix may comprise $$H_t = \begin{bmatrix} h(0,0) & 0 & \cdots & 0 \\ h(1,1) & h(1,0) & \ddots & \vdots \\ \vdots & h(2,1) & \ddots & 0 \\ h(L,L) & \vdots & \ddots & h(N-1,0) \\ 0 & h(L+1,L) & \ddots & h(N,1) \\ \vdots & \vdots & \ddots & \vdots \\ 0 & 0 & \ddots & h(P-1,L) \end{bmatrix}.$$

However, for the CP scheme, considering the CP addition at the transmitter 110 and the CP removal at the receiver 130, the channel matrix may comprise $$H_t = \begin{bmatrix} h(0,0) & 0 & \cdots & 0 & \cdots & 0 \\ h(1,1) & h(1,0) & \ddots & \vdots & \ddots & \vdots \\ \vdots & h(2,1) & \ddots & 0 & & \\ h(L,L) & \vdots & \ddots & h(N-1,0) & \ddots & \\ 0 & h(L+1,L) & \ddots & h(N,1) & \ddots & \vdots \\ \vdots & \vdots & \ddots & \vdots & & 0 \\ 0 & 0 & \ddots & h(P-1,L) & & h(P-1,0) \end{bmatrix}.$$

Demodulation of the SWF signal may be performed based applying matrix $\tilde{S}_k^H$ applied to the i-th sub-band baseband received signal, where k=1, . . . , $N_c$, may be given by $$y_k = \tilde{S}^H \tilde{E}^H r = \tilde{S}_k^H \tilde{E}_k^H H_t E_k S_k d_k + \sum_{\substack{q=1 \\ q \neq k}}^{N_c} \tilde{S}_k^H \tilde{E}_k^H H_t E_q S_q d_q + \tilde{S}_k^H \tilde{E}_k^H \eta$$

In case of cyclic prefix, matrix $\tilde{E}_k = E_k$ and matrix $\tilde{S}_k = S_k$. In case of zero padding, matrix $\tilde{E}_k = \text{diag}\{e^{j2\pi f_q n}$, n=0, . . . , N+L−1} and matrix $\tilde{S}_k$ may comprise a (N+L)×$N_{N_k}$ matrix whose columns are DPS sequences.

SWF waveforms may outperform CP-OFDM while securing better time-frequency localization. However, compared to f-OFDM, some SWF waveforms may be reshaped to maintain the time-frequency localization property. SWF may be generated based on extending the DPS sequences in the modulation. Such sequences may be called double-side extended (DSE) DPS sequences and the resulting modulated signal may be called a DSE-SWF signal. Demodulation of the DSE-SWF signal may be however performed based on non-extended DPS sequences. A DSE-SWF signal is well localized in time-frequency domain, thus offering higher spectral efficiency (SE) compared for example to f-OFDM (5G waveform). Furthermore, methods and devices for channel estimation (CE) and frequency domain equalization to deal with doubly selective channels are disclosed. The disclosed embodiments enable transmitter, receiver, or transceiver implementation with low complexity. Also, methods and devices for single user multiple input multiple output (MIMO) transmitters, receivers, or transceivers are disclosed. Moreover, a full framework assessment is provided by using low-density parity-check (LDPC) channel coding.

The example embodiments of the present disclosure improve communication over doubly selective channels. For example, challenges caused by outdated channel state information (CSI) that reduces performance of the equalizer and ICI that makes the one tap equalization inadequate may be alleviated while still enabling low-complexity implementation.

Figure 2:
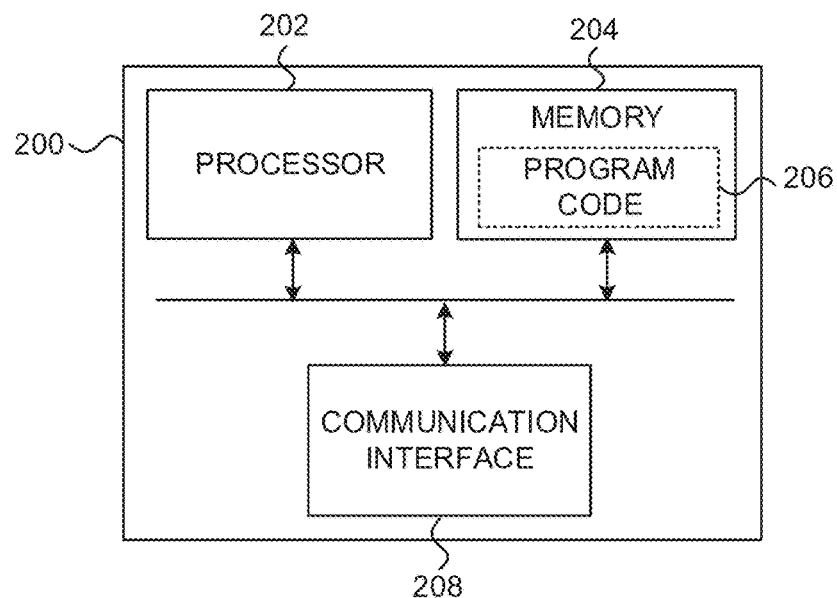
FIG. 2 illustrates an example device configured to practice one or more embodiments of the present disclosure.

FIG. 2 illustrates an example device 200 configured to practice one or more embodiments. Device 200 may be, for example, configured to generate an SWF signal and/or receive an SWF signal. Device 200 may therefore operate as a transmitter, a receiver, or a transceiver. Device 200 may comprise at least one processor 202. The at least one processor 202 may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The device 200 may further comprise at least one memory 204. The memory 204 may be configured to store, for example, computer program code or the like, for example operating system software and application software. The memory 204 may comprise one or more volatile memory devices, one or more non-volatile memory devices, and/or a combination thereof. For example, the memory may be embodied as magnetic storage devices (such as hard disk drives, magnetic tapes, etc.), optical magnetic storage devices, or semiconductor memories (such as mask ROM, PROM (programmable ROM), EPROM (erasable PROM), flash ROM, RAM (random access memory), etc.).

Device 200 may further comprise communication interface 208 configured to enable the device 200 to transmit and/or receive information. The communication interface 208 may comprise an internal communication interface such as for example an interface between baseband circuitry and radio frequency (RF) circuitry of a transmitter, receiver, or a transceiver device. Alternatively, or additionally, the communication interface 208 may be configured to provide at least one external wireless radio connection, such as for example a 3GPP mobile broadband connection (e.g. 3G, 4G, 5G, or future generations); a wireless local area network (WLAN) connection such as for example standardized by IEEE 802.11 series or Wi-Fi alliance; a short-range wireless network connection such as for example a Bluetooth connection. The communication interface 208 may hence comprise one or more antennas to enable transmission and/or reception of radio frequency signals over the air.

The device 200 may further comprise other components and/or functions such as for example a user interface (not shown) comprising at least one input device and/or at least one output device. The input device may take various forms such a keyboard, a touch screen, or one or more embedded control buttons. The output device may for example comprise a display, a speaker, a vibration motor, or the like.

When the device 200 is configured to implement some functionality, some component and/or components of the device, such as for example the at least one processor 202 and/or the at least one memory 204, may be configured to implement this functionality. Furthermore, when the at least one processor 202 is configured to implement some functionality, this functionality may be implemented using program code 206 comprised, for example, in the at least one memory 204.

The functionality described herein may be performed, at least in part, by one or more computer program product components such as software components. According to an embodiment, the device 200 comprises a processor or processor circuitry, such as for example a microcontroller, configured by the program code 206, when executed, to execute the embodiments of the operations and functionality described herein. Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), graphics processing units (GPUs), or the like.

The device 200 may be configured to perform method(s) described herein or comprise means for performing method(s) described herein. In one example, the means comprises the at least one processor 202, the at least one memory 204 including program code 206 configured to, when executed by the at least one processor 202, cause the device 200 to perform the method(s).

The device 200 may comprise, for example, a computing device such as for example a modulator chip, a demodulator chip, a modulator-demodulator (modem), a baseband chip, a mobile phone, a tablet, a laptop, an internet-of-things device, a base station, or the like. Although the device 200 is illustrated as a single device, it is appreciated that, wherever applicable, functions of the device 200 may be distributed to a plurality of devices, for example between components of a transmitter, a receiver, or a transceiver.

Figure 3:
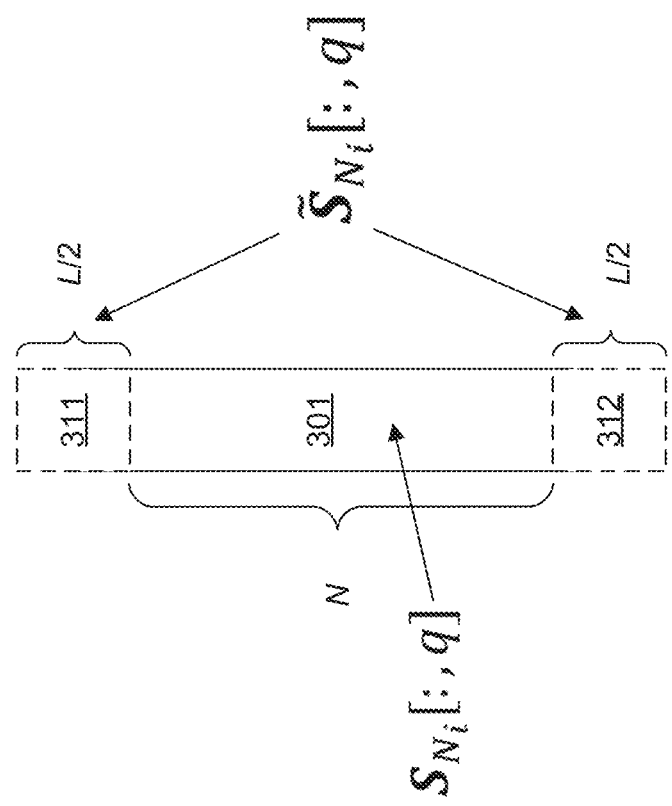
FIG. 3 illustrates an example extension of a discrete prolate spheroidal sequence, according to an embodiment of the present disclosure.

FIG. 3 illustrates an example extension of a discrete prolate spheroidal sequence, according to an embodiment of the present disclosure. As discussed above, a DSE-SWF signal may be generated by extending the used DPS sequences. Each DPS sequence may be appended at both sides with extension symbols. The extension symbols may be derived based on the symbols of the respective DPS sequence. For example, the DPS sequence 301 denoted by $S_{N_i}[:, q]$ may be appended with extension parts 311 and 312 comprising comprise extension symbols $\tilde{S}_{N_i}[:, q]$. The extension symbols may be determined for example as follows.

Considering $N_c$ sub-bands $B_i$ whose central frequencies are given by $f_i$, $i=1, \ldots, N_c$, where $N_c \geq 1$, the transmitter 110 may obtain $N_i$ (orthonormal) DPS sequences of length $T=NT_s$ with confined energy in each bandwidth $B_i$ given by the first $N_i$ eigenvectors of the Slepian matrix $C_i$, whose elements (p, q) comprise $$C_i[p, q] = \frac{\sin(\pi B_s T_s(p-q))}{\pi(p-q)},$$

where $(p, q) \in \{1, \ldots, N\}^2$, N is a length of the discrete prolate spheroidal sequences, $B_s$ is a bandwidth of the signal, and $T_s$ is a sampling period. The eigenvectors $\{u_j\}_{j=1, \ldots, N}$ may be ordered according to their eigenvalues $\lambda_1 \geq \lambda_2 \ldots \geq \lambda_N$ such that the first $N_i$ eigenvectors are associated with $N_i$ highest eigenvalues of the Slepian matrix $C_i$. Matrix $S_i$ may comprise a matrix of size $N \times N_i$ stacking the first $N_i$ eigenvectors of $C_i$. The transmitter 110 may therefore obtain a set of DPS sequences ($S_i$) associated with $N_i$ highest eigenvalues of the Slepian matrix, wherein $N_i$ is an integer.

To determine the extension symbols, for example for extension parts 311 and 312, matrix $S_i$ may be extended with L new rows (L/2 on the top and L/2 on the bottom). The extension symbols may be therefore determined based on $$\tilde{S}_i[n, q] = \frac{1}{\lambda_q} \sum_{m=0}^{N-1} \frac{\sin(\pi B_s T_s(m-n))}{\pi(m-n)} S_i[m, q],$$

where $$n \in \left\{-\frac{L}{2}, \ldots, -1\right\} \text{ and } n \in \left\{N, \ldots, N+\frac{L}{2}-1\right\}$$

is an extension symbol index, q is a sequence index, $\lambda_q$ is an eigenvalue of a q-th discrete prolate spheroidal sequence, and $S_i$ is a matrix with elements (m, q) comprising the set of discrete prolate spheroidal sequences. L/2 extension symbols may be therefore appended at a beginning of each of the set of DPS sequences and at an end of each of the DPS sequences. L may denote the number of the extension symbols for each of the set of DPS sequences. Consequently, the number of extension symbols may be the same for each of the set of extended (DPS) sequences. For n ∈ {0, . . . , N-1}, $\tilde{S}_i[n, q] = S_i[n, q]$ and therefore part 301 may comprise the original DPS sequence.

The transmitter 110 may therefore obtain a set of extended sequences comprising the set of DPS sequences appended with extension symbols derived based on convolution of respective discrete prolate spheroidal sequences. The extension symbols may be further normalized by eigenvalues associated with the respective DPS sequences. For example, for the q-th DPS sequence 301, the extensions symbols 311, 312 may be based on a convolution of the q-th DPS sequence 301. The convolution may comprise summing scaled symbols of the DPS sequence 301, for example by $$\sum_{m=0}^{N-1} \frac{\sin(\pi B_s T_s(m-n))}{\pi(m-n)} S_i[m, q],$$

as described above. The transmitter 110 may use the extended $(N+L) \times N_i$ matrix $\tilde{S}_i$ to modulate symbols in sub-band $B_i$. However, the receiver 130 may use the non-extended $N \times N_i$ matrix $S_i$ to demodulate symbols in sub-band $B_i$. Applying the DSE-DPS sequences at the transmitter 110 enables to avoid insertion of a cyclic prefix or zero padding, The length of the DPS sequences may be extended to N+L, as depicted in FIG. 3 and the extended part may be removed at the receiver 130. Even though particular steps have been describe to determine the set of extended DPS sequence, it is understood that such set of sequences may be predetermined and used at the transmitter 110 without actually determining the set of sequences at the transmitter 110. Instead, the set of sequences may be preconfigured at the transmitter 110, which may for example retrieve the set of extended sequences from a memory of the transmitter 110. It is however possible to determine the set of extended sequences at the transmitter 110, for example in order to adapt the generated signal to different radio channel conditions or communication configurations.

Figure 4:
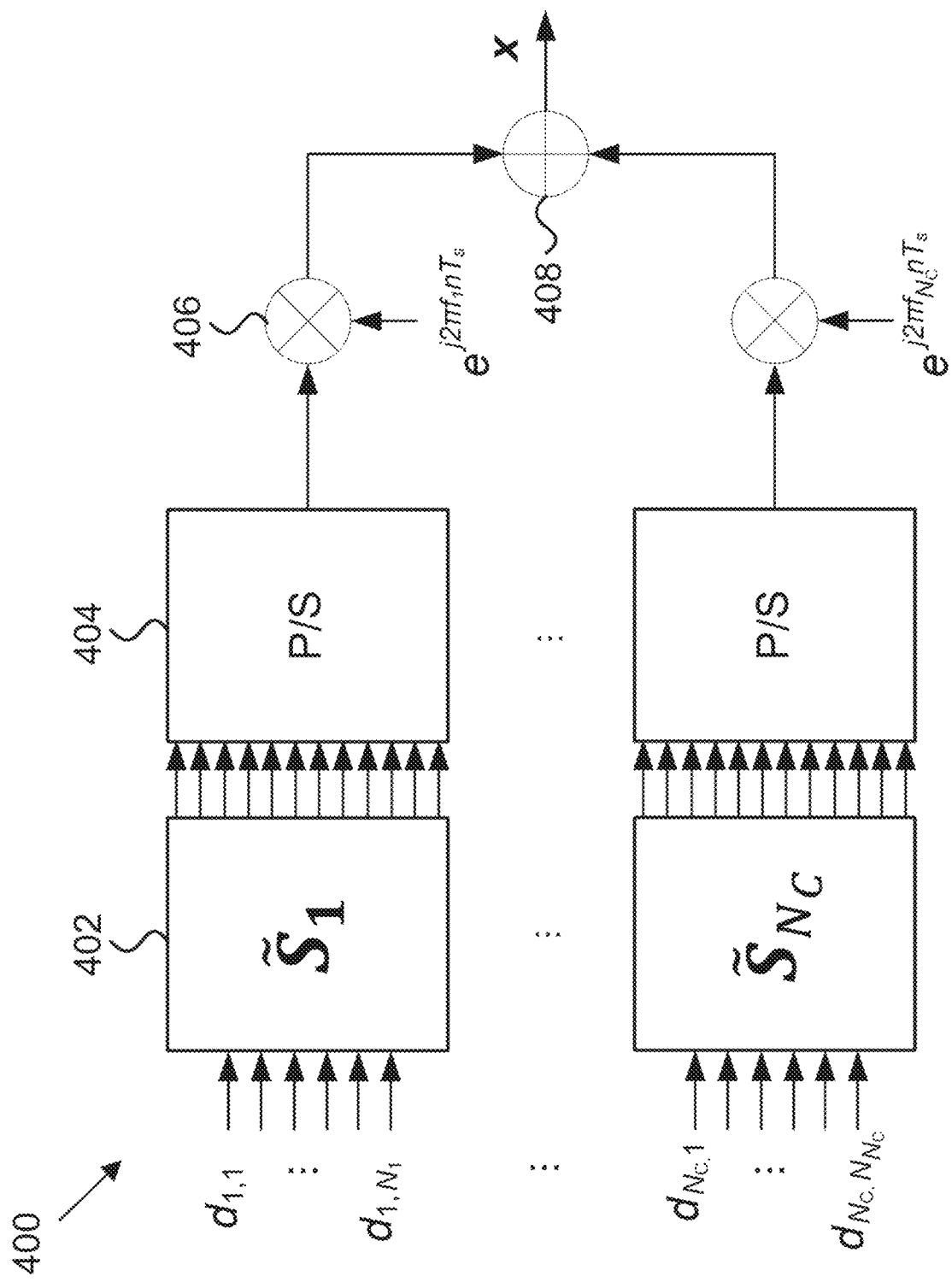
FIG. 4 illustrates an example device configured to generate a double-side extended Slepian-based waveform (DSE-SWF), according to an embodiment of the present disclosure.

FIG. 4 illustrates an example device configured to generate a double-side extended Slepian-based waveform, according to an embodiment of the present disclosure. The device 400 may comprise for example a modulator chipset. Device 400 may be implemented for example at the transmitter 110 or a transceiver. The device 400 may obtain for transmission one or more input symbol sequences $d_1$ to $d_{N_c}$ comprising input symbols $$d_{1,1} \ldots d_{1,N_1} \text{ and } d_{N_c,1} \ldots d_{N_c,N_{N_c}},$$

respectively. Again, the input symbol sequences may comprise data for transmission on one or more frequency sub-bands $B_i$, that is, $N_c \geq 1$.

At modulation block(s) 402, an i-th input symbol sequence $d_i$ ($d_{i,1} \ldots d_{i,N_i}$) may be used to modulate an i-th set of extended sequences provided in matrix $\tilde{S}_i$ to generate an SWF symbol. The parallel signal(s) output by the modulation block(s) 402 may be converted into a serial format by parallel-to-serial (P/S) converter(s) 404. Signal(s) output by the P/S converter(s) 404 may be frequency shifted by mixer(s) 406. It is noted that a plurality of input symbol sequences may be also received for transmission on each of the one or more frequency-sub bands $B_i$. Therefore, the device may generate sequences of multiple SWF symbols for each frequency-sub band $B_i$. The generated symbols may be also called DSE-SWF symbols, reflecting the use of the extended sequences provided in matrix $\tilde{S}_i$ as basis for generating the symbols.

The mixer(s) 406 may be configured to frequency shift the SWF symbols, or SWF symbol sequences, to the different frequency-sub bands $B_i$. For example, the mixer(s) may multiply the output(s) of the P/S converter(s) 404 by $e^{j2\pi f_i n}$, where $f_i$, $i=1, \ldots, N_c$, is the central frequency of each sub-band $B_i$. In case of a single frequency sub-band, the device 400 may not include any mixer. The device 400 may further comprise a combiner 408 for combining the signals on the different sub-bands $B_i$.

The generated signal over the $N_c$ frequency sub-bands $B_i$ may comprise $$x[n] = \sum_{i=1}^{N_c} \sum_{p=1}^{N_i} d_{i,p} \tilde{S}_i[n, p] e^{j2\pi f_i n}, n = -\frac{L}{2}, \ldots, N + L/2 - 1.$$

Matrix $\tilde{S}_i$ may be of size $(N+L) \times N_i$. The device 400 may generate the signal based on $$x = \sum_{q=1}^{N_c} \tilde{E}_q \tilde{S} d_q,$$

where $$\tilde{E}_q = \text{diag}\left\{e^{j2\pi f_q n}, n = -\frac{L}{2}, N + L/2 - 1\right\}.$$

The device 400 may therefore obtain a plurality of input symbol sequences for transmission in a plurality of SWF symbols. Each input symbol sequence may be used to generate one SWF symbol.

The sets of extended sequences may be different for different frequency sub-bands. The device 400 may for example obtain multiple sets of DPS sequences associated with $N_i$ highest eigenvalues of multiple Slepian matrices $C_i$, wherein i is a frequency sub-band index. Therefore, the number $N_i$ of extended sequences may be different at different frequency sub-bands $B_i$. Also, the DPS sequences comprised in the extended sets of sequences may be different, since they may be based on different Slepian matrices $C_i$. This enables the frequency sub-bands to have different bandwidths, for example in order to optimize use of transmission resources in the underlying communication system.

Figure 5:
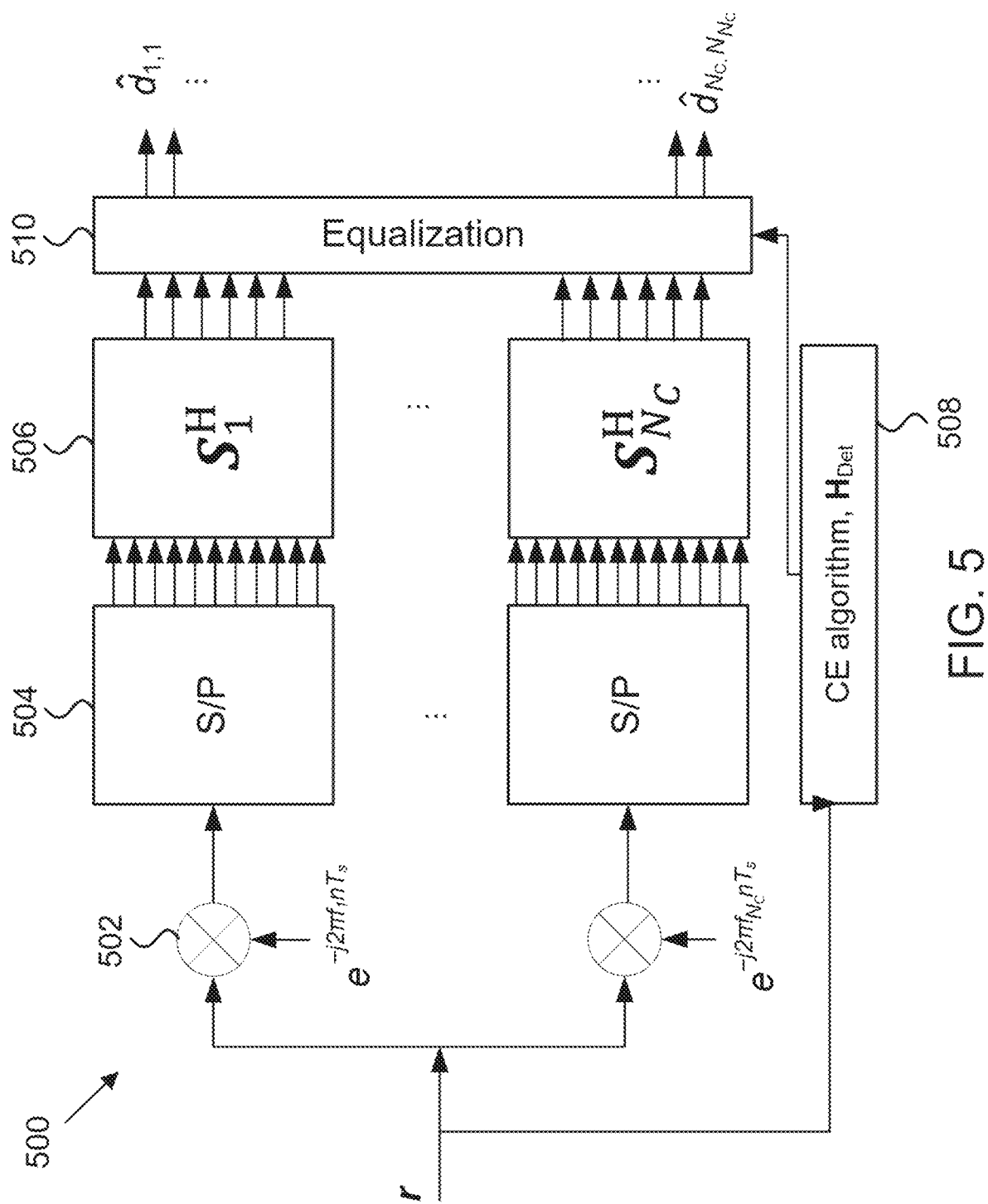
FIG. 5 illustrates an example device configured to receive a double-side extended a Slepian-based waveform, according to an embodiment of the present disclosure.

FIG. 5 illustrates an example device configured to receive a double-side extended Slepian-based waveform, according to an embodiment of the present disclosure. The device 500 may comprise for example a demodulator chipset. The device 500 may be implemented for example at the receiver 130, or a transceiver, which may also include the device 400 for generation of SWF signals. The device 500 may receive a signal that includes at least one SWF symbol modulated as described above.

The device 500 may comprise mixer(s) 502 for frequency shifting the signal(s) received on the different frequency sub-bands to baseband frequency. The serial signal(s) output by the mixer(s) may be converted into a parallel format by serial-to-parallel (S/P) converter(s) 504. Signal(s) output by the S/P converter(s) 504 may be provided to the demodulation block(s) 506. However, symbols corresponding to the extension symbols (DSE) may be removed before demodulation at block(s) 506. After DSE removal the received signal may be expressed as $$r = H_t \sum_{i=1}^{N_c} \tilde{E}_i \tilde{S}_i d_i + \eta,$$

where $H_t$ is $N \times (N+L)$ channel matrix. The channel matrix $H_t$ may be time varying such that $h(n, l) = h_c(nT_s, lT_s)$, where $h_c(t, \tau)$ is the time varying impulse response of the channel that includes transmit-receive filters as well as the doubly selective propagation effects. As discussed above, demodulation of the received signal may be based on the non-extended DPS sequences of each of the one or more frequency sub-bands $B_i$. The demodulation may be for example based on a matrix multiplication of the received signal by a Hermitian transpose $S_i^H$ of the matrix $S_i$ comprising the $N_i$ non-extended DPS sequences. The device 400 may therefore demodulate the at least one SWF symbol based on the DPS sequences associated with the $N_i$ highest eigenvalues of the Slepian matrix. In case of multiple frequency sub-bands $B_i$, the device 400 may demodulate the SWF symbol(s) received on each frequency sub-band $B_i$ based on the sets of DPS sequences associated with the $N_i$ highest eigenvalues of each Slepian matrix $C_i$. The number of DPS sequences $N_i$ and/or the Slepian matrix $C_i$ may be different for each i, as noted above.

In the above expression of the received signal, the channel impulse response may vary even within one SWF symbol, x, making the detection processing challenging. Therefore, demodulation of the received signal may comprise applying a channel estimation algorithm 508, which may provide the estimated channel state information (CSI) to the equalizer 510. The demodulation may further comprise using the channel estimation at the equalizer 510 to detect the received data symbols $\hat{d}_1$ to $\hat{d}_{N_c}$ comprising detected data symbols $\hat{d}_{1,1} \ldots \hat{d}_{1,N_1}$ and $\hat{a}_{N_c,1} \ldots \hat{a}_{N_c,N_{N_c}}$, respectively. Advanced processing may be used therein to overcome distortions such as the inter-symbol interference (ISI).

Figure 6:
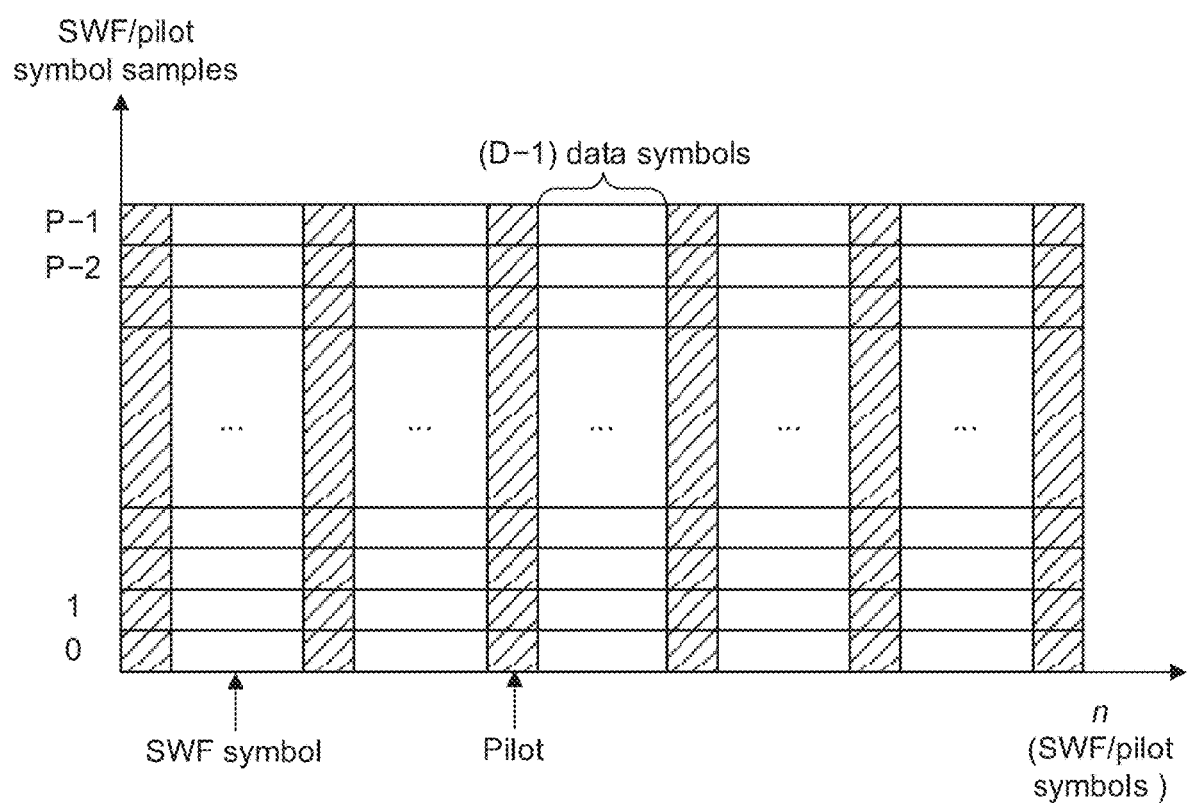
FIG. 6 illustrates an example pilot pattern for use with double-side extended Slepian-based waveform symbols, according to an embodiment of the present disclosure.

FIG. 6 illustrates an example pilot pattern for use with a double-side extended Slepian-based waveform symbols, according to an embodiment of the present disclosure. Training sequences (pilots) may be inserted within a sequence of SWF symbols to enable channel estimation. The training sequences may be inserted for example periodically, as illustrated in FIG. 6. An SWF frame may comprise sets of SWF symbols and training sequences on one or more frequency sub-bands $B_i$. The SWF frame may comprise NP training sequence vectors (pilots), one training sequence inserted every D transmitted SWF symbol vectors. Hence, one training sequence vector may be followed by (D−1) SWF (data) symbols vectors. Each pilot and SWF symbol may comprise P samples (0 . . . P−1). Herein, $$\left\lfloor \frac{M}{P} \right\rfloor = (NP \times D) + 1 \text{ and } P = N + L$$

is the length of the transmitted SWF symbol vectors. The i-th training sequence may comprise $$[\underbrace{0 \ldots 0}_{L} \underbrace{b_{i,0} \ldots b_{i,K-1}}_{K=N-L} \underbrace{0 \ldots 0}_{L}]^T.$$

Therefore, the i-th training sequence may comprise L zeros at a beginning of the training sequence and L zeros at an end of the i-th training sequence. Non-zero elements of the plurality of training sequences may comprise or be based on $b_k = e^{-j\pi Jk(k+1)/E}$, where $k \in \{0, \ldots, E-1\}$, E is an odd integer, and J is a prime integer to E. It is however noted that also other suitable training sequences may be used. The training sequence may for example comprise a Zadoff-Chu sequence, as above, or any other suitable symbol sequence, which may be complex-valued or real-valued. The training sequence may comprise a pseudorandom sequence.

In case of a single-frequency sub-band, the SWF signal may comprise training sequences inserted within a sequence of SWF symbols on a single frequency. In case of multiple frequency sub-bands, the SWF signal may comprise training sequences inserted within multiple sequences of SWF symbols corresponding to the multiple frequency sub-bands.

Referring back to FIG. 5, the channel estimation algorithm 508 may be based on a Slepian basis expansion of the radio channel. Let $\tau_{max}$ and $f_D$ be the delay spread and the Doppler spread of the radio channel, respectively, and let $T_s$ be the sampling period (sampling time) at the device 500. Both $\tau_{max}$ and $f_D$ may be measured experimentally at the device 500.

A Slepian basis expansion (SBE), bandlimited in range $[-f_D, f_D]$, where $h_c(t, \tau)$ may be presented for $t \in [\zeta MT_s, (\zeta+1) MT_s]$ using a. Q+1 coefficients $\{c_{q,l}\}_{q=0}^{Q}$ that remain invariant per block but are allowed to change with k, and
b. Q+1 Slepian sequences $\{u_q\}_{q=0}^{Q}$ that capture the time variation but are common for all k.

Each time-varying delay tap of the channel impulse response may be approximated $$h[n; \theta] = \sum_{l=0}^{L_h} \delta(\theta - l) \sum_{q=0}^{Q} c_{q,l} u_q(n)$$

where $L_h = \lfloor \tau_{max}/T_s \rfloor$ and $Q = 2 \lceil f_D MT_s \rceil$, where $\lfloor \cdot \rfloor$ and $\lceil \cdot \rceil$ present the integer floor and the integer ceiling, respectively Estimation of the (Q+1)×(L+1) coefficients, $\{c_{q,l}\}_{q=0}^{Q}$, that leads to the channel estimation over the period $(MT_s)$, using the SBE approximation, may be performed as follows. The equalizer 510 may use (NP+1) received training sequences to equalize and detect NP blocks of (D−1) SWF data vectors. The device 500 may receive a plurality of SWF symbols and a plurality of training sequences, for example corresponding to an SWF frame, or a subset thereof. The equalizer 510 may stack the received training sequences into a vector of received training sequences. The vector of received training sequences y may be of the form $y_b = \phi_b h + \eta_b$, where $\eta_b$ is additive noise. Matrix h may comprise $h = [h_0^T \ldots h_Q^T]^T$ with $h_q = [c_{q,0} \ldots c_{q,L_h}]^T$ stacking the q-th coefficients of every-th delay tap to be determined, corresponding to the $L_h+1$ delay taps of the Slepian basis expansion of the radio channel h. Matrix $\phi_b$ may comprise $$\phi_b = \begin{bmatrix} D_{0,0}^b B_0 & \ldots & D_{Q,0}^b B_0 \\ \vdots & \ddots & \vdots \\ D_{0,NP}^b B_{NP} & \ldots & D_{Q,NP}^b B_{NP} \end{bmatrix},$$

where $D_{q,i}^b$ is a diagonal matrix comprising a subset of a q-th eigenvector of the Slepian matrix. The diagonal matrices $D_{q,i}^b$ may for example comprise $$D_{q,i}^b = \underbrace{\text{diag}[u_q(t(b_i))]}_{N \times N},$$

where $t(b_i) = (i \; P \; D+L:(i \; D+1)P-1)$. The subset of the q-th eigenvector may be therefore dependent on index $\in \{0, \ldots, NP\}$, where NP+1 is a number of the received plurality of training sequences. Matrix $B_i$ may comprise a Toeplitz matrix comprising the plurality of training sequences. For example, matrix $B_i$ may comprise $$B_i = \begin{bmatrix} b_{0,i} & 0 & \ldots & 0 \\ b_{1,i} & \ddots & \ddots & \vdots \\ \vdots & \ddots & \ddots & 0 \\ b_{K-1,i} & \ddots & \ddots & b_{0,i} \\ 0 & \ddots & \ddots & b_{1,i} \\ \vdots & \ddots & \ddots & \vdots \\ 0 & \ddots & \ddots & b_{K-1,i} \end{bmatrix}.$$

Figure 7:
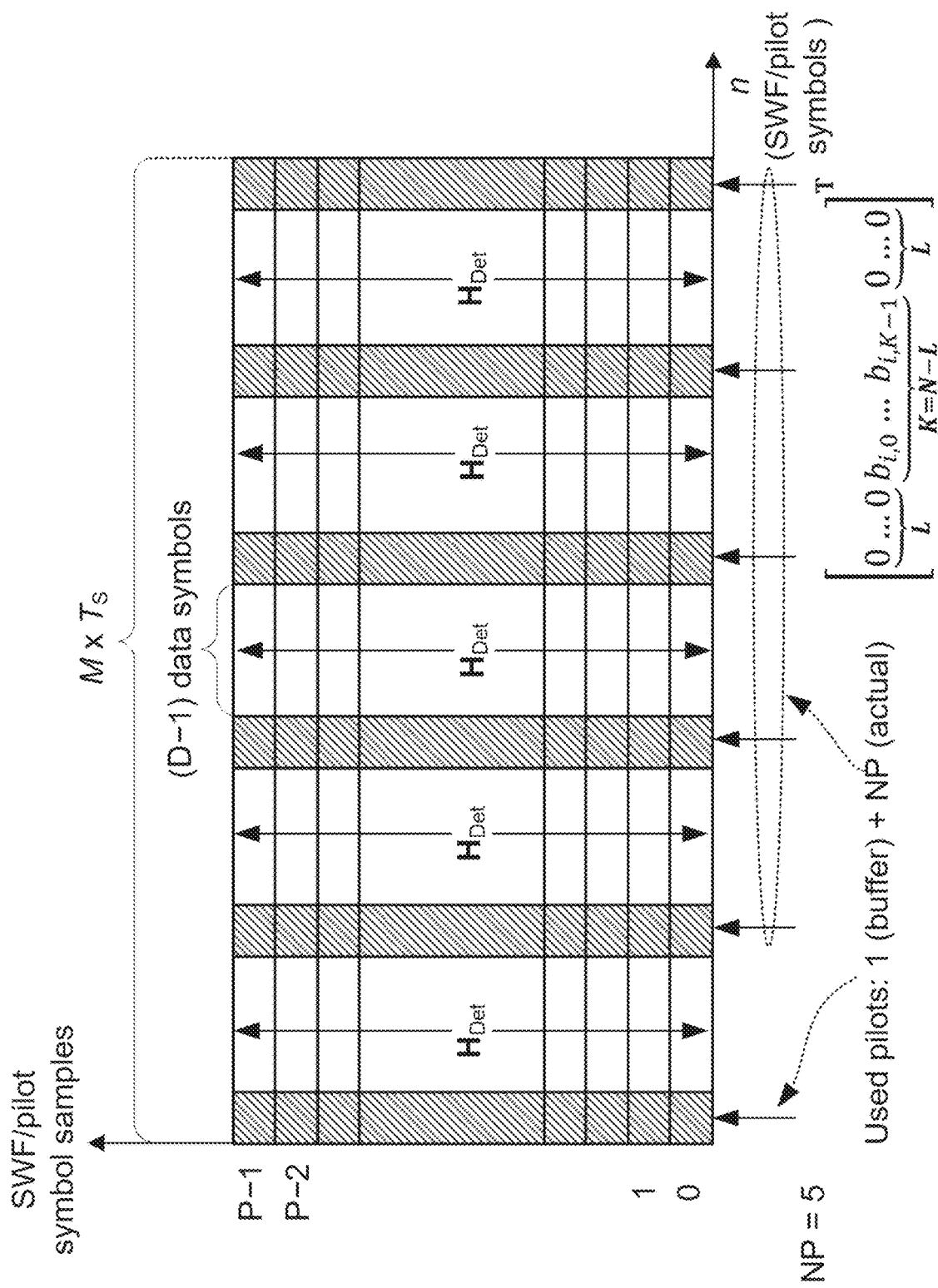
FIG. 7 illustrates an example stacking received training sequences to demodulate Slepian-based waveform symbols, according to an embodiment of the present disclosure.

FIG. 7 illustrates an example stacking received training sequences to demodulate a double-side extended Slepian-based waveform symbols, according to an embodiment of the present disclosure. As discussed above, the equalizer 510 may stack the received (NP+1) pilot vectors in $y_b$ of size (((NP+1)×P)×1). In this example, NP=5. As illustrated in FIG. 7, the equalizer 510 may use one buffered training sequence (pilot vector) and NP actual (new) training sequences to obtain the stacked vector of received training sequences. The detection may be applied to an $M \times T_s$ block of SWF symbols and pilot sequences, for example, an SWF frame.

Referring back to FIG. 5, the channel estimation algorithm 508 may determine an estimate of the radio channel based on a linear minimum mean squared error (MMSE) estimator based on the matrix $\phi_b$. Applying the linear MMSE estimator, the estimate of the channel may be determined based on $$\hat{h} = \frac{1}{\sigma_\eta^2}(R_h^{-1} + \frac{1}{\sigma_\eta^2}\phi_b^H\phi_b)^{-1}\phi_b^H y_b,$$

where $R_h=E[hh^H]$ is assumed to be known, which is acceptable since $R_h$ may depend on the channel delay profile and on the Slepian basis $\{u_q\}_{q=0}^Q$ where Trace $(R_h)=1$. The device 500 may therefore determine $R_h$ based on the available information.

The estimate of the radio channel provided by the channel estimation algorithm 508 may comprise a channel estimate matrix $H_{Det}$ of size $NP(D-1)P\times(L+1)$. Based on the channel estimate, the equalizer 510 may demodulate an m-th SWF symbol based on an m-th subset of the channel estimate matrix $H_{D,m}=H_{Det}((1:P)+(m-1)P)$.

The following algorithm may be used to detect the actual $((D-1)NP)$ received SWF symbol vectors illustrated in FIG. 7.

Parameters of the algorithm may comprise one or more of: M, NP, N, Q, L, P=N+L, $T_s$ (sec), $B_i$ (matrix: N×(L+1)), $u_q$, q=0, ..., Q (vector: M×1).

Inputs of the algorithm may comprise one or more of: $R_h$ (matrix: (Q+1) (L+1)× (Q+1) (L+1), $y_b$, $\sigma_\eta^2$, $f_d$ (Hz).

Outputs of the algorithm may comprise $H_{Det}$ (matrix: NP(D−1)P×(L+1)).

The algorithm may comprise iterating a loop comprising computation of an index vector $t_i=[i(D+1)P:(i+1)DP-1]^T$, computation of matrix $D_{q,i}^b=\mathrm{diag}[u_q(t(b_i))]$, and computation of matrix $\phi_b$ for each i=0 .... NP and each q=0 .... Q. The iteration loop may be followed by computation of $\hat{h}$ based on the linear MMSE estimator. A concatenated index vector t may be then determined as a concatenation (Concat) of the index vectors $t_i$. The estimate of the channel matrix may be determined based on the output of the linear MMSE estimator ($\hat{h}$) and a subset of elements of the Slepian basis vectors ug determined based on the concatenated index vector t.

The algorithm may be expressed as pseudocode as follows:

for i=0: NP, q=0:Q
    compute $t_i=[i(D+1)P:(i+1)DP-1]^T$
    compute $D_{q,i}^b=\mathrm{diag}\ [u_q(t(b_i))]$
    compute $\phi_b$ Compute: $\hat{h} = \frac{1}{\sigma_\eta^2}(R_h^{-1} + \frac{1}{\sigma_\eta^2}\phi_b^H\phi_b)^{-1}\phi_b^H y_b$ Compute: t=Concat $[t_i]$, and $H_{Det}(n, l)=\Sigma_{q=0}^Q \hat{h}[l+q(L+1)]u_q[t(n)]$.

The channel estimation algorithm provides the matrix $H_{Det}$ of size $NP(D-1)P\times(L+1)$ that concatenates $NP(D-1)$ matrices. As described above, the detector uses the m-th $P\times(L+1)$ channel matrix $H_{D,m}=H_{Det}((1:P)+(m-1)P)$ to detect the m-th demodulated (signal domain) SWF received symbol vector. In the sequel, index m is dropped for simplicity.

Figure 8:
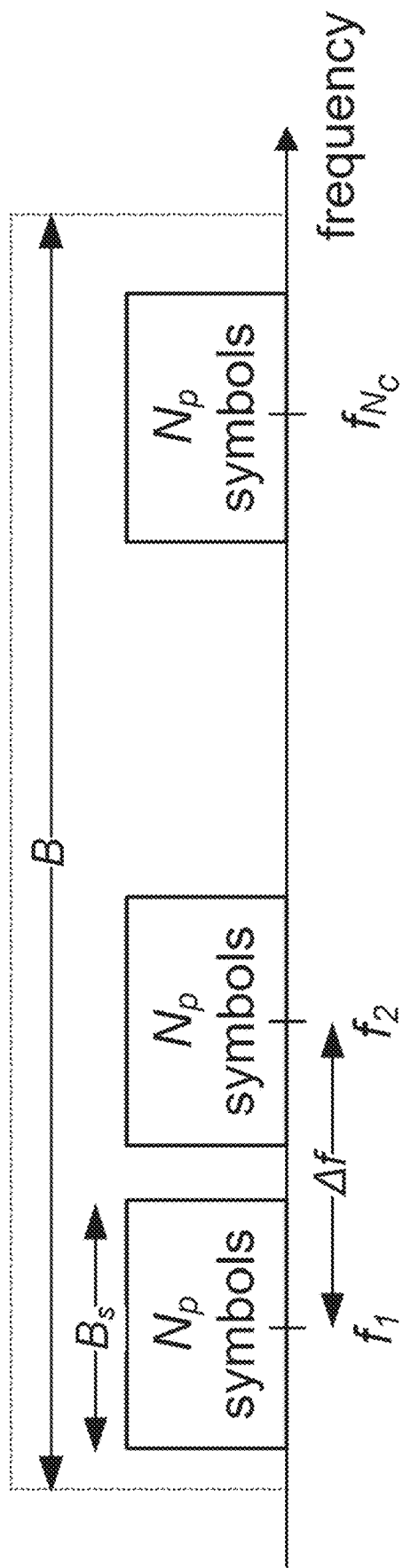
FIG. 8 illustrates an example multi-band transmission of double-side extended Slepian-based waveforms, according to an embodiment of the present disclosure.

Demodulation of the received SWF symbols may be based on applying $S_k^H$ to the k-th sub-band baseband received signal. The demodulated signal of the k-th sub-band may comprise $$y = S^H E_k^H r = S_k^H E_k^H H_t \tilde{E}\tilde{S}_k d_k + \sum_{\substack{q=1 \\ q\neq k}}^{N_C} S_k^H E_k^H H_t \tilde{E}_q \tilde{S}_k d_q + S_k^H E_k^H \eta$$

where $E_k=\mathrm{diag}\{e^{j2\pi f_k n}, n=0, \ldots, N-1\}$. However, the sub-band cross interference may be expressed as $$I_k = \sum_{\substack{q=1 \\ q\neq k}}^{N_C} S_k^H E_k^H H_t \tilde{E}_q \tilde{S}_k d_q,$$

where $I_k\approx 0$ when $|f_q-f_k|>(B_q+B_k)/2$. This is illustrated by the example of FIG. 8, where each sub-band $f_i$ comprises $N_p$ symbols within a bandwidth of $B_s$, and where the total bandwidth is B.

When $I_k\approx 0$, $y_k$ reduces to $y_k=H_k d_k+\tilde{\eta}_k$, where $H_k=S_k^H E_k^H H_t \tilde{E}_k \tilde{S}_k$ denotes the k-th sub-band effective channel matrix and $\tilde{\eta}_k=S_k^H E_k^H \eta$ is the demodulated noise vector of the k-th sub-band. Consequently, the equalization may be performed using for example block-wise MMSE or block-wise ordered successive interference cancellation (OSIC), which enables to reduce complexity. According to the definition of the diagonal matrix $E_k$, and due to the orthogonality of the Slepian basis $S_k$, the noise $\tilde{\eta}_k$ remains Gaussian and uncorrelated, where $$E[\tilde{\eta}_k \tilde{\eta}_k^H]=\sigma_\eta^2 I_{N_p}, \text{ for } k=1, \ldots, N_c.$$

According to an embodiment, the device 500 may detect the received SWF symbol(s) based on block-wise MMSE. Herein, the MMSE may be applied over the k-th sub-band. This may be implemented based on multiplying the demodulated vector $y_k$ by a matrix $W_k$, where $$W_k=H_k^H(H_k H_k^H+\sigma^2 I)^{-1}$$

Hence, the equalized symbols may be obtained based on $\tilde{d}_k=W_k y_k$. According to the Gaussian approximation of the MMSE equalizer output, the equalized symbols may be modeled as $$\tilde{d}_{k,z}=\mu_{k,z} d_{k,z}+\xi_{k,z}, \ z=0, \ldots, N_p-1,$$

where $\mu_{k,z}$ are the diagonal entries of $W_k H_k$, and $\xi_{k,z}$ is a zero-mean Gaussian noise with variance $\sigma_{k,z}^2=\mu_{k,z}-\mu_{k,z}^2$. The log-likelihood ratio (LLR) of the i-th bit of the z-th symbol in $d_k$ may be approximated by $$LLR(b_{k,z,i}) \approx \frac{1}{\sigma_{k,z}^2}\left(\min_{b_{k,z}\in\mathcal{B}_i^-}|\tilde{d}_{k,z}-\mu_{k,z}d(b_{k,z})|^2 - \min_{b_{k,z}\in\mathcal{B}_i^+}|\tilde{d}_{k,z}-\mu_{k,z}d(b_{k,z})|^2\right)$$

where $b_{k,z} \in \{-1, +1\}^m$ is a binary vector, $d(b_{k,z})$ is the symbol mapping ($2^m$-QAM for example), and $\mathcal{B}_i^+$ (respectively $\mathcal{B}_i^-$) is the set of all vectors $b_{k,z}$ with «+1» (respectively «−1») in their i-th entry. For example, in the example quadratic phase-shift keying (QPSK) mapping, the exact LLRs may be given by $$LLR(b_{k,z,0}) = \frac{2\sqrt{2}}{1-\mu_{k,z}} \Re\{\tilde{d}_{k,z}\},$$

$$LLR(b_{k,z,1}) = \frac{2\sqrt{2}}{1-\mu_{k,z}} \Im\{\tilde{d}_{k,z}\}.$$

The LLRs may be provided as an output of the device 500, for example to a channel decoder of the receiver 130, for example an LDPC decoder.

Figure 9:
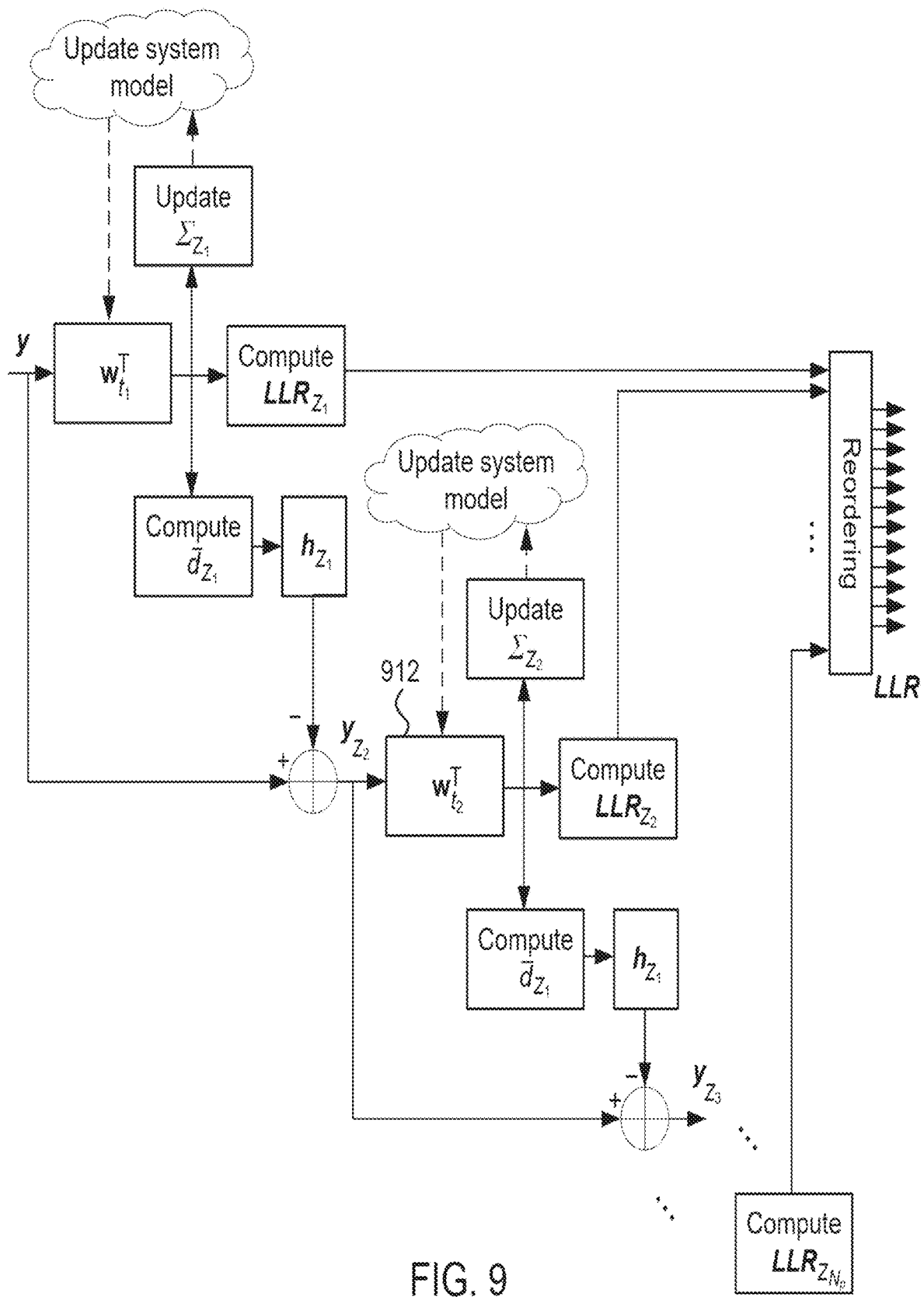
FIG. 9 illustrates an example block-wise ordered successive interference cancellation (OSSIC) device for receiving Slepian-based waveform symbols, according to an embodiment of the present disclosure.

FIG. 9 illustrates an example block-wise ordered successive interference cancellation (OSSIC) device for receiving a double-side extended Slepian-based waveform symbols, according to an embodiment of the present disclosure. According to an embodiment, the receiver 130 may apply block-wise OSSIC over the sub-bands. Therein, for each sub-band k, where k=1, ..., $N_c$, the detector may apply MMSE-OSSIC in each iteration i, where i=1, ..., $N_k$ is the index of the OSIC stage. The contribution of the detected symbol may be cancelled out from the received signal in each iteration.

Let $(z_1, z_2, \ldots, z_{l-1})$ be the order of the indices of the detected symbols in the vector $d_k$ after (l−1) iterations and (l=1, ..., $N_p$). At the l-th iteration, the demodulated signal may comprise $$y_{k,z_l} = H_{k,z_l} d_{k,z_l} + \tilde{N}_k + \in_{k,z_l}.$$

where $d_{k,z_l}$ is the data vector $d_k$ after removing the entries indexed by $z_1, \ldots, z_{l-1}$, the matrix $H_{k,z_l}$ is the matrix $H_k$ after removing the corresponding columns, and $E_{k,z_l}$ is the residual interference due to the decision errors of the previously detected data symbols.

The received vector may be updated based on $y_{k,z_l} = y_{k,z_{l-1}} - h_{k,z_l} \bar{d}_{k,z_{l-1}}$ where $h_{k,z_l}$ is the column of the matrix $H_k$ indexed by $z_l$, and the symbol $\bar{d}_{k,z_{l-1}}$ is the soft estimation obtained by computing the statistical mean value of the previous detected symbol $d_{k,z_{l-1}}$. It follows that the residual interference is $$\in_{k,z_l} = \Sigma_{l'=1}^{l-1} h_{k,z_l}(d_{k,z_{l'}} - \bar{d}_{k,z_{l'}}).$$

Furthermore, the MMSE equalizer at stage l may be expressed as $$W_{k,z_l} = H_{k,z_l}^H (H_{k,z_l} H_{k,z_l}^H + \sigma^2 I + R_{k,z_l})^{-1}.$$

$R_{k,z_l}$ is the residual interference covariance matrix and is given by $$R_{k,z_l} = [h_{k,z_1}, \ldots, h_{k,z_{l-1}}] \Sigma_{k,l} [h_{k,z_1}, \ldots, h_{k,z_{l-1}}]^H.$$

The sum $\Sigma_{k,l}$ comprises a diagonal matrix given by $\Sigma_{k,l} = \mathbb{E}\{\in_{k,z_l} \in_{k,z_l}^H\}$. The equalized vector at the l-th stage (with l=1, ..., $N_p$) may be obtained based on $$\hat{d}_{k,z_l} = W_{k,z_l} H_{k,z_l} d_{k,z_l} + W_{k,z_l}(\tilde{n}_k + \in_{k,z_l}).$$

The index $Z_l$ of the symbol to be detected in stage l may be the one with the best post-detection signal-to-interference ratio (SINR), $Z_l = \Omega_l(t)$, with $\Omega_l = \{1, \ldots, N_p\} \setminus \{z_1, \ldots, z_{l-1}\}$. The index t may be determined based on $$t = \arg\max_{a \in \{1, \ldots, |\Omega_l|\}} \frac{|w_{k,a}^T h_{k,\Omega_l(a)}|^2}{\Sigma_{m \neq a} |w_{k,m}^T h_{k,\Omega_l(m)}|^2 + w_{k,a}^T(\Sigma_{k,z_l} + \sigma^2 I) w_{k,a}^*}$$

with $[W_{k,1}, W_{k,2}, \ldots, W_{k,|\Omega_l|}]^T = W_{k,z_l}$. Consequently, the equalized symbol $\hat{d}_{k,z_l}$ at stage $l$ is the $t$-th element of $d_{k,z_l}$ and the $z_l$-th element of $d_k$, and given by $$\hat{d}_{k,z_l} = w_{k,t}^T y_{k,z_l}.$$

Now, by applying a Gaussian approximation of MMSE equalization output, we have $$\hat{d}_{k,z_l} = \mu_{k,z_l} d_{k,z_l} + \xi_{k,z_l},$$

where $\mu_{k,z_l} = w_{k,t}^T h_{k,z_l}$, and $\xi_{k,z_l}$ is a zero-mean complex Gaussian noise with variance $\sigma_{k,z_l}^2 = \mu_{k,z_l} - \mu_{k,z_l}^2$.

The log-likelihood ratio (LLR) of the i-th bit of the $Z_l$-th symbol ($b_{k,z_l,i}$) in $d_k$ may approximated as $$LLR(b_{k,z_l,i}) \approx$$

$$\frac{1}{\sigma_{k,z_l,i}^2} \left( \min_{b_{k,z_l} \in \mathcal{B}_i^-} |\hat{d}_{k,z_l} - \mu_{k,z_l} d(b_{k,z_l})|^2 - \min_{b_{k,z_l} \in \mathcal{B}_i^+} |\hat{d}_{k,z_l} - \mu_{k,z_l} d(b_{k,z_l})|^2 \right)$$

where $d(b_{k,z_l})$ stands for the symbol mapping operation. Therefore, the soft symbol used for soft interference cancellation may be obtained based on $$\bar{d}_{k,z_l} = \frac{\sum_{d \in \mathcal{D}} d \times \exp\left(-\frac{|\hat{d}_{k,z_l} - \mu_{k,z_l} d|^2}{\sigma_{k,z_l}^2}\right)}{\sum_{d \in \mathcal{D}} \exp\left(-\frac{|\hat{d}_{k,z_l} - \mu_{k,z_l} d|^2}{\sigma_{k,z_l}^2}\right)},$$

where $\mathcal{D}$ is the set of possible data symbols (e.g. a constellation set), while the diagonal elements of $\Sigma_{k,l}$, needed to determine the index t are given by $$\Sigma_{k,z_l}(q,q) = \frac{\sum_{d \in \mathcal{D}} |d - \bar{d}_{k,z_q}|^2 \times \exp\left(-\frac{|\hat{d}_{k,z_q} - \mu_{k,z_q} d|^2}{\sigma_{k,z_q}^2}\right)}{\sum_{d \in \mathcal{D}} \exp\left(-\frac{|\hat{d}_{k,z_q} - \mu_{k,z_q} d|^2}{\sigma_{k,z_q}^2}\right)},$$

where q=1, ..., l−1.

The algorithm is graphically illustrated in FIG. 9. At each iteration, an LLR may be computed for the $z_l$-th element of the equalized vector (sub-band index k omitted in this example) based on the received vector y, where influence of any previously detected symbols has been removed. The sum $\Sigma_{z_l}$ may be updated at each iteration and the system model used as basis for $$w_{t_{Z_l}}$$

at each iteration may be updated accordingly. After the last iteration, the LLRs may be reordered to provide soft-bit information for the detected symbols in the original order.

According to an embodiment, the DSE-SWF modulation may be applied in a MIMO system (MIMO-DSE-SWF). Considering MIMO spatial multiplexing with $N_t$ transmit and $N_r$ receive antennas. The transmit signal by the t-th antenna may be expressed as $$x_t = \frac{1}{\sqrt{N_t}} \sum_{q=1}^{N_c} \tilde{F}_q \tilde{S}_q d_{q,t},$$

where $d_{q,t}$ is the vector containing the $N_p$ symbols to be transmitted in the q-th frequency sub-band at the t-th antenna. The transmitter 110 may therefore generate $N_cSWF$ symbol sequences for each frequency sub-band, corresponding to the number of transmit antennas. And, the receiver 130 may receive $N_r$ SWF symbol sequences at each frequency sub-band, corresponding to the number of receive antennas. Any applicable MIMO coding scheme may be used to determine the data transmitted at each transmit antenna. Note that MIMO-DSE-SWF may be also applied in case of single frequency sub-band.

The received signal vector after DSE removal at the l-th antenna may comprise $$r_l = \sum_{t=1}^{N_t} H_{l,t} \sum_{q=1}^{N_c} \tilde{E}_q \tilde{S}_q d_{q,t} + \eta_l.$$

Subsequently, the demodulated signal vector in the k-th subband and the l-th antenna may be expressed as $$y_{k,l} = S_k^H E_k^H r_l =$$

$$\frac{1}{\sqrt{N_t}} \sum_{t=1}^{N_t} S_k^H E_k^H H_{l,t} \tilde{E}_k \tilde{S}_k d_{k,t} + \frac{1}{\sqrt{N_t}} \sum_{t=1}^{N_t} \sum_{\substack{q=1 \\ q \neq k}}^{N_c} S_k^H E_k^H H_{l,t} \tilde{E}_q \tilde{S}_q d_{q,t} + S_k^H E_k^H \eta_l$$

Since the inter-sub-band interference $$\sum_{\substack{q=1 \\ q \neq k}}^{N_c} S_k^H E_k^H H_{l,t} \tilde{E}_q \tilde{S}_q d_{q,t} \approx 0,$$

blockwise equalization may be applied. Consequently, the system model may be simplified as $$y_{k,l} = \sum_{t=1}^{N_t} Q_{k,l,t} d_{k,t} + \tilde{\eta}_{k,l},$$

where $\tilde{\eta}_{k,l} = S_k^H E_k^H \eta_l$, and $$Q_{k,l,t} = \frac{1}{\sqrt{N_t}} S_k^H E_k^H H_{l,t} \tilde{E}_k \tilde{S}_k$$

is the effective channel between the t-th transmit and the l-th receive antenna at the k-th subband.

Stacking the received vectors $y_{k,l}$, l=1, . . . , $N_r$ for a specific frequency sub-band k ($y_k = [y_{k,1}, \ldots, y_{k,N_r}]^T$), the MIMO-DSE-SWF may be expressed as $$y_k = \underbrace{\begin{bmatrix} Q_{k,1,1} & \cdots & Q_{k,1,N_t} \\ \vdots & \ddots & \vdots \\ Q_{k,N_r,1} & \cdots & Q_{k,N_r,N_t} \end{bmatrix}}_{Q_k} \underbrace{\begin{bmatrix} d_{k,1} \\ \vdots \\ d_{k,N_t} \end{bmatrix}}_{d_k} + \tilde{\eta}_k,$$

where $\tilde{\eta}_k = [\tilde{\eta}_{k,1}, \ldots, \tilde{\eta}_{k,N_r}]^T$ is the noise vector, and the overall MIMO effective channel matrix $Q_k$ at the k-th frequency sub-band has the dimension $N_rN_p \times N_tN_p$. The data vector $d_k$ transmitted at the k-th frequency sub-band may be estimated using for example the MMSE or OSSIC receivers, as described above.

The example embodiments of the present disclosure provide a Slepian-based waveform using the double-side extended DPS sequences in the modulation. However, demodulation of the DSE-SWF may be based on the non-extended DPS sequences. The DSE-SWF signal improves localization of the signal in time-frequency domain. The example embodiments may be applied at a transmitter, a receiver, or a transceiver. Furthermore, an efficient channel estimation algorithm is disclosed, using the Slepian basis expansion (SBE). The channel estimation may carried out in time domain while feeding the equalization (for detection) carried out in frequency domain. The example embodiments enable a low complexity transceiver implementation.

For example, a multiband transceiver may be implemented using the flexible (e.g. frequency sub-band specific) Slepian matrices formed by double-side extended DPS sequences at the transmitter. The scalable Slepian matrix enables a scalable SWF data rate. The extension of the DPS sequences enables to avoid use of a cyclic prefix or zero-padding, which improves spectral efficiency. A receiver may use the Hermitian transpose(s) of the one or more Slepian matrices used by the transmitter. The example embodiments may be applied for example with a MIMO scheme and/or carrier aggregation to communicate over a multiband spectrum.

Performance of DSE-SWF has been assessed in 3GPP channels. The f-OFDM system, transmitting over 5 MHz, using $N_a$=300 data (active) subcarriers with a FFT size $N_{FFT}$=512 and subcarrier spacing $\delta f$=15 KHz, is used as a benchmark. Hence, the sampling frequency is set to $f_s$=7.68 MHz and the DSE-SWF vector symbol duration is equal to the f-OFDM symbol duration T=66.67 μs. The f-OFDM filter is given by $$f[n] = \frac{\sin(\omega_c n)}{\omega_c n} \left( \frac{1}{2} - \frac{1}{2} \cos\left( \frac{2\pi n}{L_f - 1} \right) \right)^{0.6}$$

where $L_f$=129 and $\omega_c$=1.8715 is the normalized cut-off frequency. Furthermore, QPSK symbols are used for transmission using a carrier frequency $f_c$=3.5 GHz and the LDPC code rate of 1/2. In the simulations, L=36 which corresponds to a maximum delay spread $\tau_{max}$=4.69 μs μs while the receiver velocity v=300 Kmph, leading to a maximum Doppler spread of $f_D$=972 Hz, unless stated otherwise. Without loss of generality, on equal sub-bands schemes, where $N_1 = \ldots = N_{N_c} = N_p$, are considered. A comparison is carried out, where the performance results are based on assuming perfect CSI knowledge at the receiver. Moreover, sensitivity to the channel estimation errors when using the Slepian basis expansion method is presented.

Figure 10:
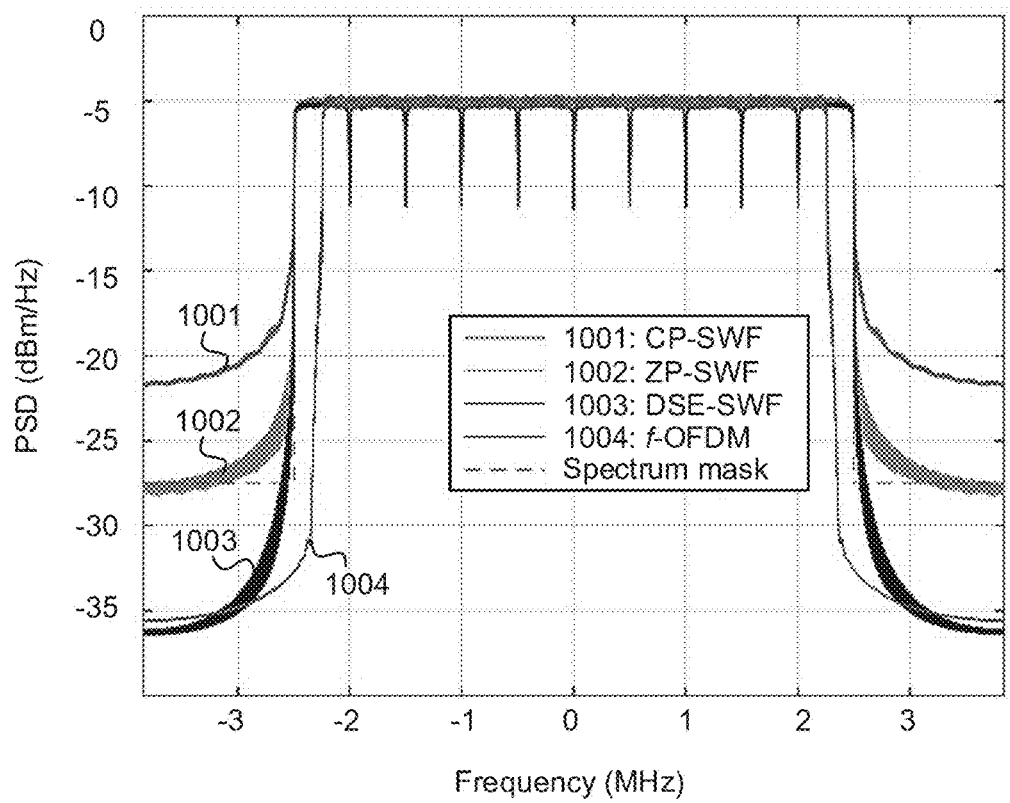
FIG. 10 illustrates an example power spectral densities of filtered orthogonal frequency division multiplexing (f-OFDM) and different Slepian-based waveforms, according to an embodiment of the present disclosure.

FIG. 10 illustrates an example power spectral densities of filtered orthogonal frequency division multiplexing (f-OFDM) and different Slepian-based waveforms, according to an embodiment of the present disclosure. In this example, $N_p$=31 and $N_c$=10, leading to a spectral efficiency gain of 3.33% compared to f-OFDM. The power spectral densities (PSD) of different SWF versions, that is, with zero padding (curve 1001), with cyclic prefix (1002), and with DSE (1003) as well as PSD of f-OFDM (1004) and the spectrum mask are depicted in FIG. 10.

Figure 11:
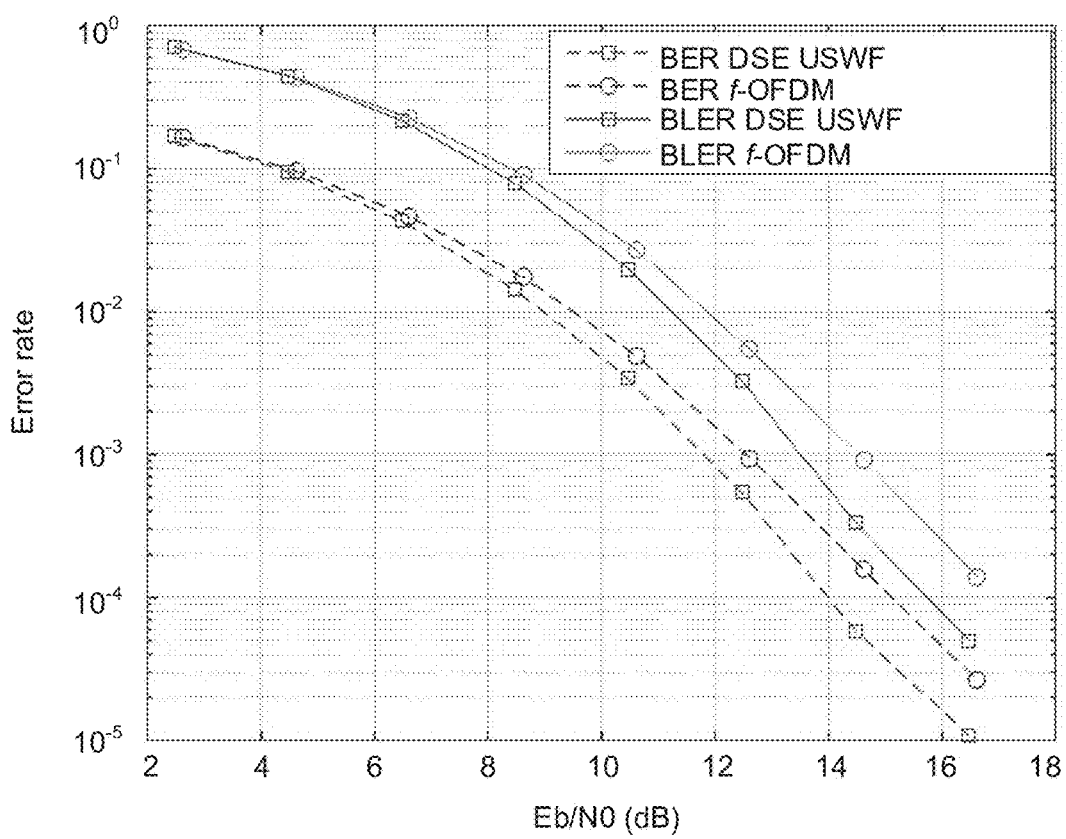
FIG. 11 illustrates an example performance of double-side extended Slepian-based waveforms with block-wise minimum mean squared error (MMSE) detection, according to an embodiment of the present disclosure.

FIG. 11 illustrates an example performance of double-side extended Slepian-based waveforms with block-wise minimum mean squared error (MMSE) detection, according to an embodiment of the present disclosure. The Tapped Delay Line C (TDL-C) channels are considered and the bit error rate (BER) and block error rate (BLER) performance of both DSE-SWF and OFDM are shown. In the simulations of FIG.

Figure 15:
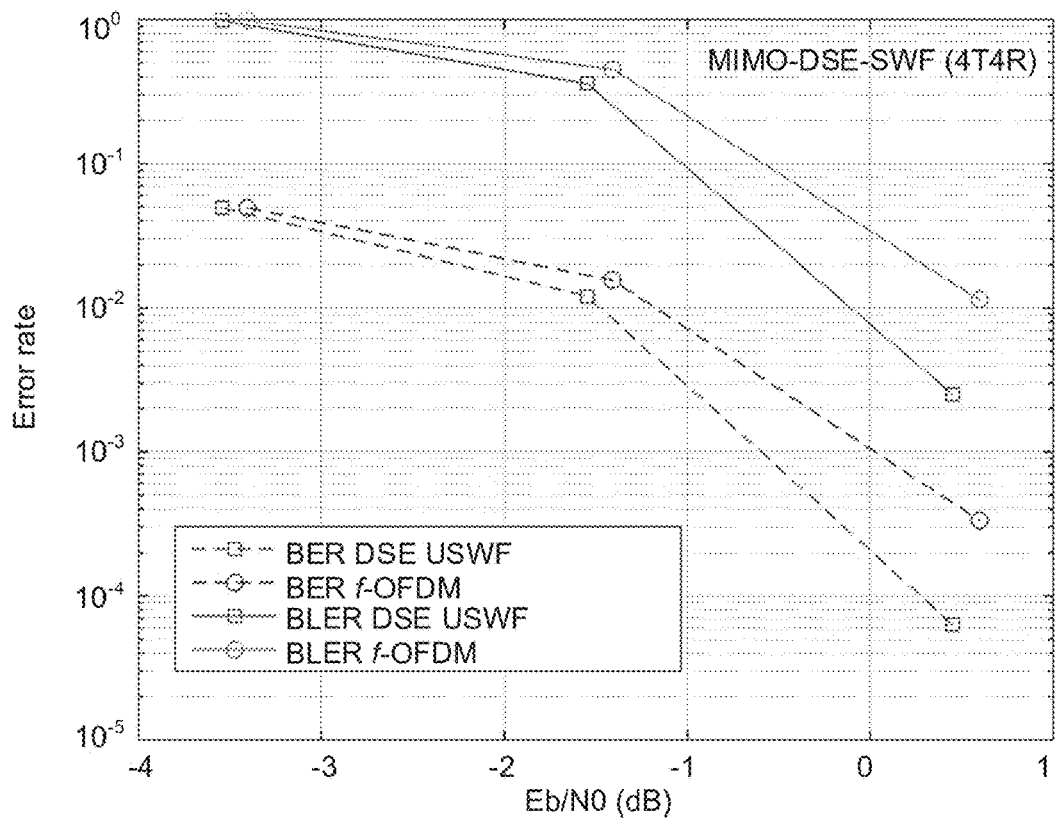
FIG. 15 illustrates an example performance comparison of double-side extended Slepian-based waveforms with block-wise OSSIC and f-OFDM in case of a 4×4 multiple input multiple output (MIMO) scheme, according to an embodiment of the present disclosure.

11 to FIG. 15, SWF with uniform bandwidth split (USWF) was used. Hence, all sub-bands have the same bandwidth and they use the same number of DPSs. DSE-SWF clearly outperforms f-OFDM in terms of BER and BLER, when MMSE detection is used.

Figure 12:
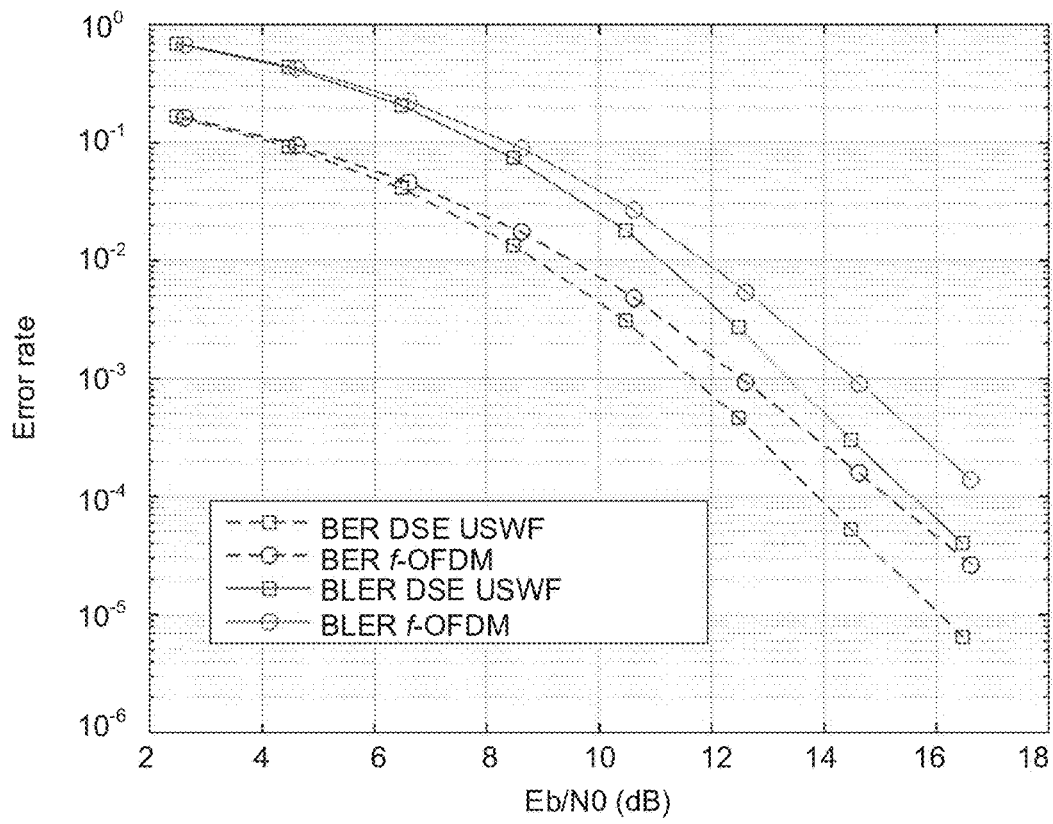
FIG. 12 illustrates an example performance of double-side extended Slepian-based waveforms with a block-wise OSSIC, according to an embodiment of the present disclosure.

FIG. 12 illustrates an example performance of double-side extended Slepian-based waveforms with a block-wise OSSIC, according to an embodiment of the present disclosure. Similar to FIG. 11, the TDL-C channels are considered a DSE-SWF which clearly outperforms f-OFDM in terms of BER and BLER, when OSSIC is used.

Based on FIG. 11 and FIG. 12 it is observed that a SNR gain of approximately 1 dB may be obtained by DSE-SWF compared to f-OFDM both in case of MMSE and OSSIC. Furthermore, the DSE-SWF using the block-wise processing may be performed at complexity order of $O(N_{swf} N_p^2)$ where $N_{swf} = N_c N_p$. This is a linear complexity order that remains comparable to the one-tap equalization that 5G use with f-OFDM. Therefore, a clear performance advantage may be obtained while maintaining low complexity.

Figure 13:
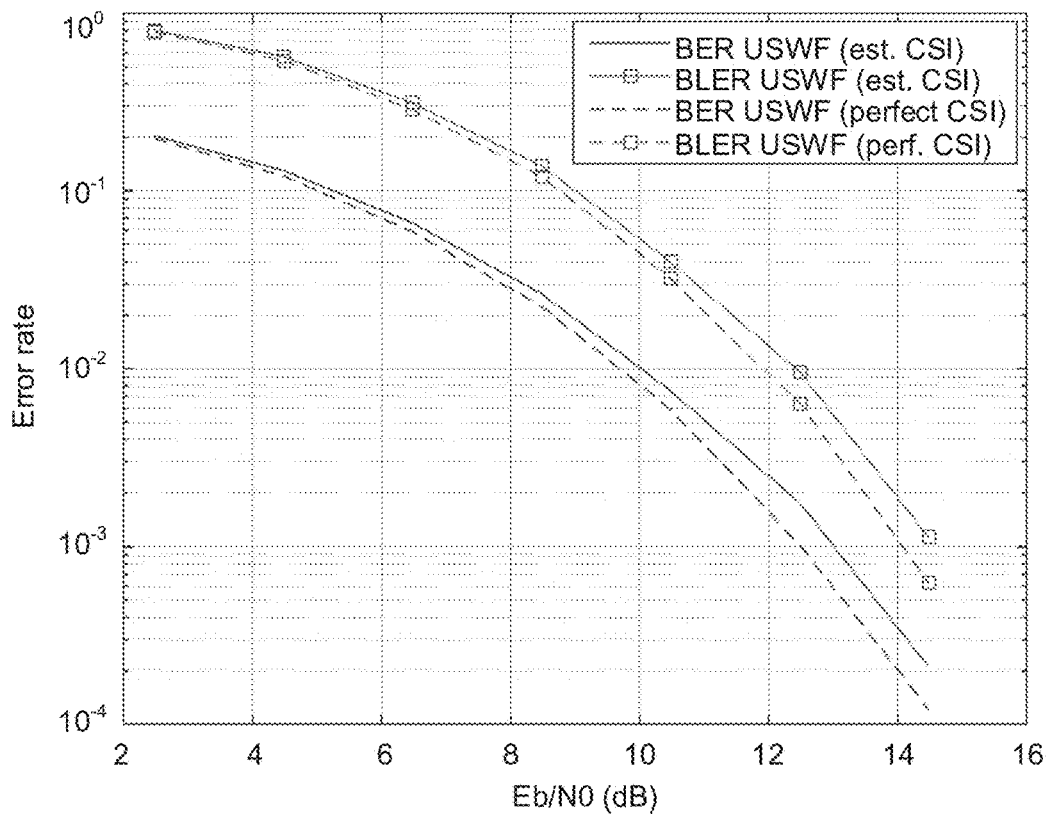
FIG. 13 illustrates an example sensitivity to channel estimation errors for double-side extended Slepian-based waveforms with a block-wise OSSIC, according to an embodiment of the present disclosure.

FIG. 13 illustrates an example sensitivity to channel estimation errors for double-side extended Slepian-based waveforms with a block-wise OSSIC, according to an embodiment of the present disclosure. Simulation results are provided for using in the 3GPP Extended Typical Urban (ETU) channel model, where the same configurations as described above have been maintained. The Slepian basis expansion model with NP=2 and D=5 has been used for channel estimation. Without loss of generality, the same training signals given by the Zadoff-Chu sequences, as $b_{i,k} = b_k = e^{-j\pi J k(k+1)/E}$, $k \in \{0, \ldots, E-1\}$, have been used. Herein, E is an odd integer and/is a prime integer to E. In this example, E=K=N−L=473, and J=9. The performance of the block-wise OSSIC for DSE-SWF under perfect and imperfect (estimated) CSI was analysed. The BER performance curves show that the disclosed channel estimation algorithm is robust and the channel estimation errors have low impact.

Figure 14:
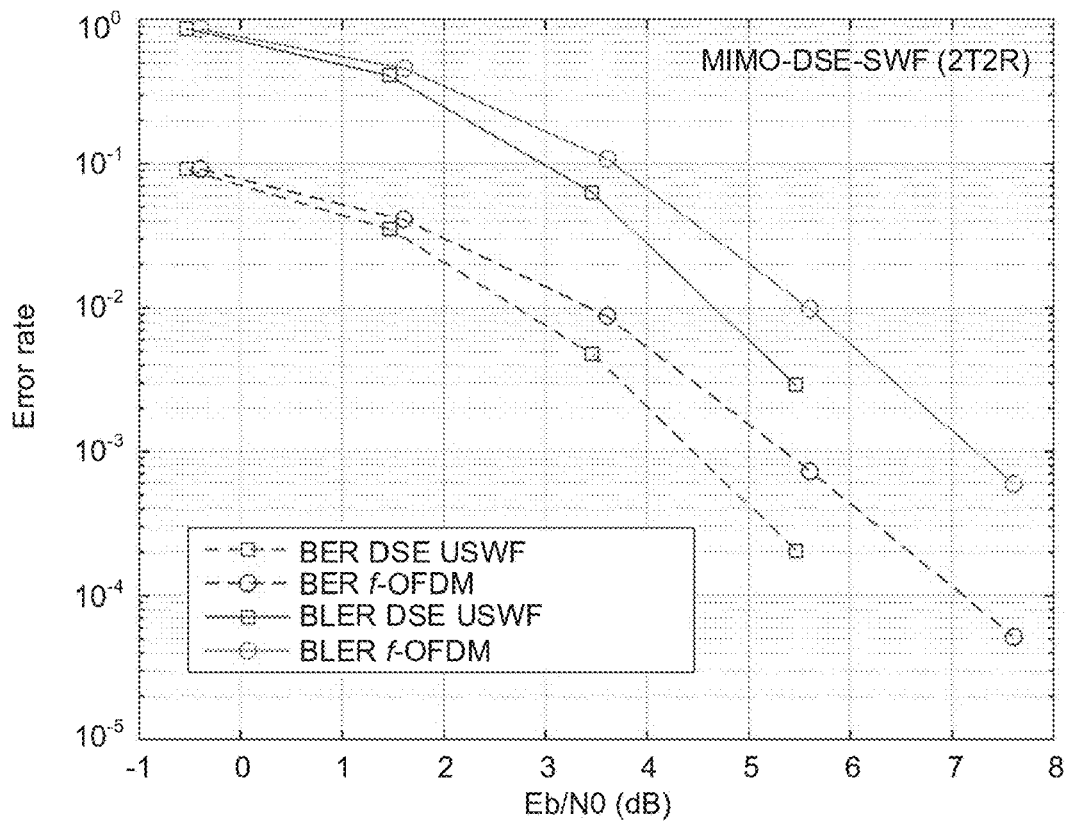
FIG. 14 illustrates an example performance comparison of double-side extended Slepian-based waveforms with block-wise OSSIC and f-OFDM in case of a 2×2 multiple input multiple output (MIMO) scheme, according to an embodiment of the present disclosure.

FIG. 14 illustrates an example performance comparison of double-side extended Slepian-based waveforms with block-wise OSSIC and f-OFDM in case of a 2×2 multiple input multiple output (MIMO) scheme, according to an embodiment of the present disclosure. In this example, the MIMO system comprises two transmit antennas and two receive antennas (2T2R).

FIG. 15 illustrates an example performance comparison of double-side extended Slepian-based waveforms with block-wise OSSIC and f-OFDM in case of a 4×4 multiple input multiple output (MIMO) scheme, according to an embodiment of the present disclosure. In this example, the MIMO system comprises four transmit antennas and four receive antennas (4T4R).

Figure 16:
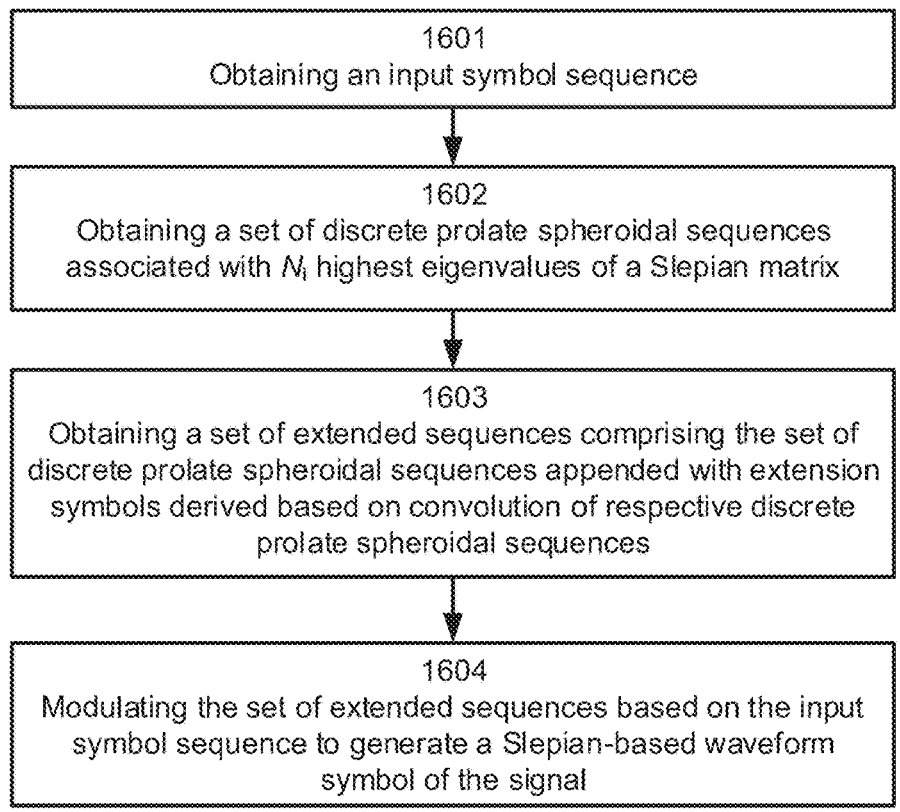
FIG. 16 illustrates an example method for generating a signal, according to an embodiment of the present disclosure.

Based on FIG. 14 and FIG. 15, it is observed that MIMO-DSE-SWF outperforms the MIMO-f-OFDM both in case of 2T2R and 4T4R schemes. For example, a SNR gain of approximately 1 dB may be achieved in low SNR regime FIG. 16 illustrates an example method for generating a signal, according to an embodiment of the present disclosure.

At 1601, the method may comprise obtaining an input symbol sequence.

At 1602, the method may comprise obtaining a set of discrete prolate spheroidal sequences associated with $N_i$ highest eigenvalues of a Slepian matrix. $N_i$ may be an integer.

At 1603, the method may comprise obtaining a set of extended sequences comprising the set of discrete prolate spheroidal sequences appended with extension symbols derived based on convolution of respective discrete prolate spheroidal sequences. The extension symbols may be normalized by eigenvalues associated with the respective discrete prolate spheroidal sequences.

At 1604, the method may comprise modulating the set of extended sequences based on the input symbol sequence to generate a Slepian-based waveform symbol of the signal.

Figure 17:
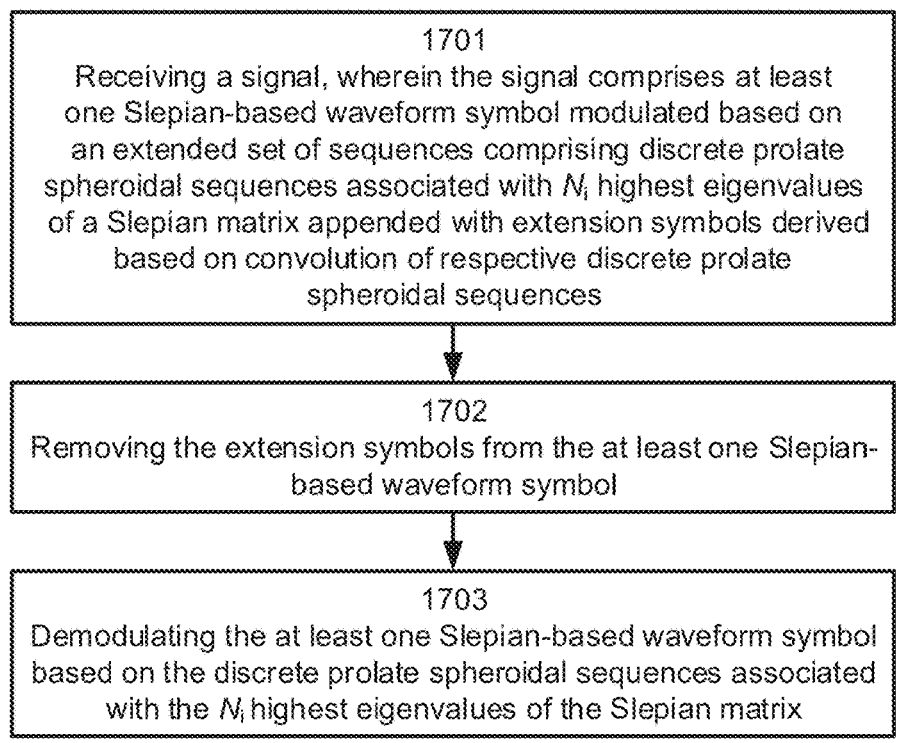
FIG. 17 illustrates an example method for receiving a signal, according to an embodiment of the present disclosure.

FIG. 17 illustrates an example method for receiving a signal, according to an embodiment of the present disclosure.

At 1701, the method may comprise receiving the signal, wherein the signal comprises at least one Slepian-based waveform symbol modulated based on an extended set of sequences comprising discrete prolate spheroidal sequences associated with $N_i$ highest eigenvalues of a Slepian matrix appended with extension symbols derived based on convolution of respective discrete prolate spheroidal sequences. $N_i$ may be an integer and the extension symbols may be normalized by eigenvalues associated with the respective discrete prolate spheroidal sequences.

At 1702, the method may comprise removing the extension symbols from the at least one Slepian-based waveform symbol.

At 1703, the method may comprise demodulating the at least one Slepian-based waveform symbol based on the discrete prolate spheroidal sequences associated with the $N_i$ highest eigenvalues of the Slepian matrix.

Further features of the methods directly result from the functionalities and parameters of the methods and devices, for example transmitter 110 or 400, receiver 130 or 500, or a combination thereof, or apparatus 200, as described in the appended claims and throughout the specification and are therefore not repeated here.

A device or a system may be configured to perform or cause performance of any aspect of the method(s) described herein. Further, a computer program or a computer program product may comprise program code configured to cause a device to perform any aspect of the method(s) described herein, when the computer program is executed on the device. Further, the computer program product may comprise a computer readable storage medium storing program code thereon, the program code comprising instruction for causing a device to perform any aspect of the method(s) described herein. Further, a device may comprise means for performing any aspect of the method(s) described herein. According to an example embodiment, the means comprises at least one processor, and at least one memory including program code, the at least one processor, and program code configured to, when executed by the at least one processor, cause performance of any aspect of the method(s).

The functions and modules of devices 400 and 500 may be implemented by any suitable means, for example at device 200. Hence, devices 400 and 500, may comprise necessary software and/or hardware, such as for example processing circuitry and memory, for implementing said functions or modules.

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items. Furthermore, references to 'at least one' item or 'one or more' items may refer to one or a plurality of those items.

The operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or device may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. A device for generating a signal, comprising at least one processor and a memory storing instructions that, when executed by the at least one processor, cause the device to:
   obtain an input symbol sequence;
   obtain a set of discrete prolate spheroidal sequences associated with $N_i$ highest eigenvalues of a Slepian matrix, wherein $N_i$ is an integer;
   obtain a set of extended sequences comprising the set of discrete prolate spheroidal sequences appended with extension symbols derived based on a convolution of respective discrete prolate spheroidal sequences, wherein the extension symbols are normalized by eigenvalues associated with the respective discrete prolate spheroidal sequences; and
   modulate the set of extended sequences based on the input symbol sequence to generate a Slepian-based waveform symbol of the signal.

2. The device according to claim 1, wherein the discrete prolate spheroidal sequences comprise eigenvectors of the Slepian matrix $C_i$, where elements (p, q) of the Slepian matrix are $$C_i[p, q] = \frac{\sin(\pi B_s T_s (p-q))}{\pi(p-q)},$$

where $(p, q) \in \{1, \ldots, N\}^2$, N is a length of the discrete prolate spheroidal sequences, $B_s$ is a bandwidth of the signal, and $T_s$ is a sampling period.

3. The device according to claim 1, wherein the instructions, when executed by the at least one processor, further cause the device to append L/2 extension symbols at a beginning of each of the set of discrete prolate spheroidal sequences and at an end of each of the discrete prolate spheroidal sequences, wherein L is a number of the extension symbols for each of the set of discrete prolate spheroidal sequences.

4. The device according to claim 3, wherein the instructions, when executed by the at least one processor, further caused the device to determine the extension symbols $\tilde{S}_i[n, q]$ based on $$\tilde{S}_i[n, q] = \frac{1}{\lambda_q} \sum_{m=0}^{N-1} \frac{\sin(\pi B_s T_s (m-n))}{\pi(m-n)} S_i[m, q],$$

where $$n \in \left\{-\frac{L}{2}, \ldots, -1\right\} \text{ and } n \in \left\{N, \ldots, N + \frac{L}{2} - 1\right\}$$

is an extension symbol index, q is a sequence index, $\lambda_q$ is an eigenvalue of a q-th discrete prolate spheroidal sequence, and $S_i$ is a matrix with elements (m, q) comprising the set of discrete prolate spheroidal sequences.

5. The device according to claim 1, wherein the instructions, when executed by the at least one processor further cause the device to:
   obtain a plurality of input symbol sequences for transmission in a plurality of Slepian-based waveform symbols;
   modulate the set of extended sequences based on the plurality of input symbol sequences to generate a Slepian-based waveform symbol sequence; and
   insert a plurality of training sequences periodically within the Slepian-based waveform symbol sequence, wherein each of the plurality of training sequences comprises L zeros at a beginning of the training sequence and L zeros at an end of the training sequence.

6. The device according to claim 1, wherein the instructions, when executed by the at least one processor, further cause the device to:
   obtain a plurality of the input symbol sequences for transmission in a plurality of Slepian-based waveform symbols on a plurality of frequency sub-bands $f_i$;
   obtain a plurality sets of discrete prolate spheroidal sequences associated with $N_i$ highest eigenvalues of a plurality of Slepian matrices $C_i$, wherein i is a frequency sub-band index;
   obtain a plurality sets of extended sequences comprising the plurality sets of discrete prolate spheroidal sequences appended with extension symbols derived based on convolution of respective discrete prolate spheroidal sequences, wherein the extension symbols are normalized by eigenvalues associated with the respective discrete prolate spheroidal sequences;
   modulate the plurality sets of extended sequences based on the plurality of input symbol sequences to generate a plurality of Slepian-based waveform symbol sequences;
   insert a plurality of training sequences periodically within the plurality of Slepian-based waveform symbol sequences, wherein each of the plurality of training sequences comprises L zeros at a beginning of the training sequence and L zeros at an end of the training sequence; and frequency-shift the plurality of Slepian-based waveform symbol sequences to the plurality of frequency sub-bands $f_i$.

7. The device according to claim 5, wherein non-zero elements of the plurality of training sequences comprise $b_k = e^{-j\pi Jk(k+1)/E}$, where $k \in \{0, \ldots, E-1\}$, E is an odd integer, and J is a prime integer to E.

8. A device, comprising at least one processor and a memory storing instructions that, when executed by the at least one processor, cause the device to:
receive a signal, wherein the signal comprises at least one Slepian-based waveform symbol modulated based on an extended set of sequences comprising discrete prolate spheroidal sequences associated with $N_i$ highest eigenvalues of a Slepian matrix appended with extension symbols derived based on a convolution of respective discrete prolate spheroidal sequences, wherein $N_i$ is an integer and the extension symbols are normalized by eigenvalues associated with the respective discrete prolate spheroidal sequences;
remove the extension symbols from the at least one Slepian-based waveform symbol; and
demodulate the at least one Slepian-based waveform symbol based on the discrete prolate spheroidal sequences associated with the $N_i$ highest eigenvalues of the Slepian matrix.

9. The device according to claim 8, wherein the instructions, when executed by the at least one processor, further cause the device to:
receive a plurality of Slepian-based waveform symbols;
receive a plurality of training sequences located periodically within the plurality of Slepian-based waveform symbols, wherein each of the plurality of training sequences comprises L zeros at a beginning of the training sequence and L zeros at an end of the training sequence;
stack the received plurality of training sequences into a vector of received training sequences;
determine an estimate of a radio channel for the plurality of Slepian-based waveform symbols based on the vector of received training sequences; and
equalize the plurality of Slepian-based waveform symbols based on the estimate of the radio channel.

10. The device according to claim 9, wherein the instructions, when executed by the east one processor, further cause the device to:
receive the plurality of Slepian-based waveform symbols and the plurality of training sequences on a plurality of frequency sub-bands $f_i$, wherein the plurality of Slepian-based waveform symbols is associated with a plurality of Slepian matrices $C_i$, wherein i is a frequency sub-band index.

11. The device according to claim 9, wherein non-zero elements of the plurality of training sequences comprise $b_k = e^{-j\pi Jk(k+1)/E}$, where $k \in \{0, \ldots, E-1\}$, E is an odd integer, and J is a prime integer to E.

12. The device according to claim 9, wherein the vector of received training sequences $y_b$ is of the form $y_b = \phi_b h + \eta_b$, where $\eta_b$ is additive noise, where $h = [h_0^T \ldots h_Q^T]^T$ and $h_q = [c_{q,0} \ldots C_{q,L_h}]^T$ comprises q-th coefficients of $L_h+1$ delay taps of a Slepian basis expansion of the radio channel h, and where matrix $\phi_b$ comprises $$\phi_b = \begin{bmatrix} D_{0,0}^b B_0 & \ldots & D_{Q,0}^b B_0 \\ \vdots & \ddots & \vdots \\ D_{0,NP}^b B_{NP} & \ldots & D_{Q,NP}^b B_{NP} \end{bmatrix},$$

where $D_{q,i}^b$ is a diagonal matrix comprising a subset of a q-th eigenvector of the Slepian matrix, wherein the subset of the q-th eigenvector is dependent on index $i \in \{0, \ldots, NP\}$, where NP+1 is a number of the received plurality of training sequences, and where $B_i$ is a Toeplitz matrix comprising the plurality of training sequences, and
wherein the device is further configured to determine the estimate of the radio channel based on a linear minimum mean squared error estimator based on the matrix $\phi_b$.

13. The device according to claim 12, wherein $D_{q,i}^b = \mathrm{diag}[u_q(t(b_i))]$, where $t(b_i) = i\,P\,D+L:(i\,D+1)\,P-1$, where $P=N+L$ and $D-1$ is a number of Slepian-based waveform symbols between training sequences, and wherein $$B_i = \begin{bmatrix} b_{0,i} & 0 & \ldots & 0 \\ b_{1,i} & \ddots & \ddots & \vdots \\ \vdots & \ddots & \ddots & 0 \\ b_{K-1,i} & \ddots & \ddots & b_{0,i} \\ 0 & \ddots & \ddots & b_{1,i} \\ \vdots & \ddots & \ddots & \vdots \\ 0 & \ldots & 0 & b_{K-1,i} \end{bmatrix}.$$

14. The device according to claim 13, wherein the estimate of the radio channel comprises a channel estimate matrix $H_{Det}$ of size $NP(D-1)P \times (L+1)$, and wherein the device is further configured to demodulate an m-th Slepian-based waveform symbol of the plurality of Slepian-based waveform symbols based on an m-th subset of the channel estimate matrix $H_{D,m} = H_{Det}((1:P)+(m-1)P)$.

15. A method for generating a signal, comprising:
obtaining an input symbol sequence;
obtaining a set of discrete prolate spheroidal sequences associated with $N_i$ highest eigenvalues of a Slepian matrix, wherein $N_i$ is an integer;
obtaining a set of extended sequences comprising the set of discrete prolate spheroidal sequences appended with extension symbols derived based on a convolution of respective discrete prolate spheroidal sequences, wherein the extension symbols are normalized by eigenvalues associated with the respective discrete prolate spheroidal sequences; and
modulating the set of extended sequences based on the input symbol sequence to generate a Slepian-based waveform symbol of the signal.

16. The method according to claim 15, wherein the discrete prolate spheroidal sequences comprise eigenvectors of the Slepian matrix $C_i$, where elements (p, q) of the Slepian matrix are $C_i[p, q] = \sin(\pi B_s T_s(p-q))/\pi(p-q)$, where $(p, q) \in \{1, \ldots, N\}^2$, N is a length of the discrete prolate spheroidal sequences, $B_s$ is a bandwidth of the signal, and $T_s$ is a sampling period.

17. The method according to claim 15, further comprising appending L/2 extension symbols at a beginning of each of the set of discrete prolate spheroidal sequences and at an end of each of the discrete prolate spheroidal sequences, wherein L is a number of the extension symbols for each of the set of discrete prolate spheroidal sequences.

18. The method according to claim 17, further comprising determining the extension symbols $\tilde{S}_i[n, q]$ based on $$\tilde{S}_i[n, q] = \frac{1}{\lambda_q} \sum_{m=0}^{N-1} \frac{\sin(\pi B_s T_s(m-n))}{\pi(m-n)} S_i[m, q],$$

where n∈{−L/2, . . . ,−1} and n∈{N, . . . , N+L/2−1} is an extension symbol index, q is a sequence index, $\lambda_q$ is an eigenvalue of a q-th discrete prolate spheroidal sequence, and $S_i$ is a matrix with elements (m, q) comprising the set of discrete prolate spheroidal sequences.

* * * * *

UNITED STATES PATENT AND TRADEMARK OFFICE
CERTIFICATE OF CORRECTION

PATENT NO. : 12,388,687 B2
APPLICATION NO. : 18/524048
DATED : August 12, 2025
INVENTOR(S) : Kamel Tourki It is certified that error appears in the above-identified patent and that said Letters Patent is hereby corrected as shown below:

In the Specification

Column 6, Line 63, change "43.5 GHZ" to --43.5 GHz--;

Column 7, Line 5, change "1.8 GHZ" to --1.8 GHz--;

In the Claims

Column 26, Claim 4, Line 9, change "caused" to --cause--; and

Column 27, Claim 10, Line 43, change "the east one" to --the at least one--.

Signed and Sealed this
Thirtieth Day of September, 2025

John A. Squires
*Director of the United States Patent and Trademark Office*